(12) United States Patent
Matsushita

(10) Patent No.: US 7,961,887 B2
(45) Date of Patent: Jun. 14, 2011

(54) CONTENT DISTRIBUTION SYSTEM AND TRACKING SYSTEM

(75) Inventor: Tatsuyuki Matsushita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 769 days.

(21) Appl. No.: 11/970,666

(22) Filed: Jan. 8, 2008

(65) Prior Publication Data

US 2008/0165958 A1    Jul. 10, 2008

(30) Foreign Application Priority Data

Jan. 10, 2007  (JP) ................................ 2007-002658

(51) Int. Cl.
 *H04L 9/08* (2006.01)
(52) U.S. Cl. ........................... 380/280; 380/281; 726/26
(58) Field of Classification Search .................. 380/280, 380/281, 282; 713/158; 726/26; 725/9, 725/25, 31
See application file for complete search history.

(56) References Cited

U.S. PATENT DOCUMENTS

| | | | |
|---|---|---|---|
| 2003/0152234 A1 | 8/2003 | Matsushita | 380/277 |
| 2005/0157878 A1 | 7/2005 | Matsushita | 380/239 |
| 2007/0180233 A1 | 8/2007 | Matsushita | 713/159 |

FOREIGN PATENT DOCUMENTS

| | | |
|---|---|---|
| EP | 1 331 751 A1 | 7/2003 |
| JP | 2000-253459 A | 9/2000 |
| JP | 2002-165081 A | 6/2002 |
| JP | 2006-19975 A | 1/2006 |

OTHER PUBLICATIONS

IEICE Technical Report, *"Hierarchical Key Assignment for Efficient Public-Key Black-Box Tracing against Self-Defensive Pirates"*; Matsushita, et al., pp. 91-98, 2006.
Proc. of DRM 2001, *"On Crafty Pirates and Foxy Tracers"*, A. Kiayias, et al., LNCS 2320, pp. 22-39, 2002.
Cox, et al., *"A Secure, Robust Watermark for Multimedia"*; Proc. Information Hiding, LNCS 1174, pp. 185-206, 1996.
T. Matsushita, *"Black-Box Traitor Tracing Schemes for Copyright Protection"*, PhD Thesis, The University of Tokyo, Juapan, Jan. 2006, 13 pps.
Matsushita, et al., *"Hierarchical Key Assignment for Black-Box Tracing With Efficient Ciphertext Size"*, Information and Communications Security Lecture Notes in Computer Science, pp. 92-111, Jan. 1, 2006.

(Continued)

*Primary Examiner* — Edward Zee
(74) *Attorney, Agent, or Firm* — Ohlandt, Greeley, Ruggiero & Perle, L.L.P.

(57) ABSTRACT

A content distribution system encrypts a content by using different session keys assigned to user systems, encrypts each of the session keys with a public key corresponding to a decryption key unique to each user system, generates, for a group of user identification information items, header information including the encrypted session keys, and a first vector which corresponds to a session key of the session keys and is assigned to arbitrary user identification information u in the group, the first vector being set such that an inner product of the first vector and a second vector concerning the user identification information u becomes equal to $z_j u^v$ (where $z_j$ is a constant value of a session key $s_j$ assigned to the user identification information u, and v is group identification information to the group), and transmits the header information and one of the encrypted contents to the user systems.

25 Claims, 14 Drawing Sheets

OTHER PUBLICATIONS

Matsushita, et al., "*A Public-Key Black Box Traitor Tracing Scheme with Sublinear Ciphertext Size Against Self-Defensive Pirates*", Advances in Cryptology, pp. 206-275, 2004.

Naor, et al., "*Revocation and Tracing Schemes for Stateless Receivers*", http://eprint.iacr.org/2001/059.pdf, Jul. 24, 2002, pp. 1-34.

Matsushita, et al., "*A Flexible-Revocation Scheme for Efficient Public-Key Black-BoxTraitor Tracing*"; IEICE Trans. Fundamentals, vol. E88-A, No. 4, Apr. 2005, pp. 1055-1062.

Office Action from corresponding EP 07024310.0 dated Feb. 23, 2010.

Matsushita, et al., "*Hierarchical Key Assignment for Efficient Public-Key Black-Box Tracing against Self-Defensive Pirates*", Information Processing Society of Japan Technical Report, vol. 1, Jul. 21, 2006, No. 81 pp. 321-328 (w/Abstract).

Office Action from corresponding JP 2007-002658 dated Sep. 24, 2008 (w/translation).

CONTENT DISTRIBUTION SYSTEM AND TRACKING SYSTEM

CROSS-REFERENCE TO RELATED APPLICATIONS

This application is based upon and claims the benefit of priority from prior Japanese Patent Application No. 2007-002658, filed Jan. 10, 2007, the entire contents of which are incorporated herein by reference.

BACKGROUND OF THE INVENTION

1. Field of the Invention

The present invention relates to a data communication system which transmits encrypted contents and header information for decrypting the encrypted contents from a content distribution system to a plurality of user systems.

2. Description of the Related Art

Conventionally, in broadcast-type content distribution business, broadcast program content is encrypted, and the encrypted content is distributed to users. For example, a user decrypts encrypted content by using an authorized decryption unit leased by a distributor, and views/listens to the broadcast program through the obtained content. In broadcast-type content distribution business, however, there are unauthorized users who produce pirate decryption units (unauthorized decryption units) by copying internal information (decryption key or the like) of an authorized decryption unit, and can illegally decrypt encrypted content.

Various types of unauthorized user specifying methods are known, which can specify such an unauthorized user. Such unauthorized user specifying methods are classified into three types according to decryption key generation methods for users. The first type is a method based on a combinatorial arrangement. The second type is a method based on a tree structure. The third type is a method based on an algebraic arrangement.

The first unauthorized user specifying method has a problem that a very large transmission overhead is required to sufficiently decrease the probability at which an authorized user who is not concerned in the generation of an unauthorized decryption unit is erroneously detected as an unauthorized user.

The second and third unauthorized user specifying methods solve this problem and achieve efficient transmission overhead.

An unauthorized decryption unit may store a plurality of decryption keys or data having functions equivalent to decryption keys in a conspiracy involving a plurality of unauthorized users. Black box tracking is sometimes performed for this unauthorized decryption unit to specify an unauthorized user by observing only the input/output of the unit without breaking it open. More specifically, a tracker who performs black box tracking assumes a candidate for an unauthorized user (to be referred to as a suspect hereinafter) and checks whether the decryption key of the suspect is held by an unauthorized decryption unit, by only observing the input/output of the unauthorized decryption unit.

In the second and third unauthorized user specifying methods, one of the following two problems is left unsolved:

Problem 1: In black box tracking, the intention of each input (assumed suspect) is known by an unauthorized decryption unit. If a smart unauthorized decryption unit reads the intention of an input and prevents the unauthorized user from being specified, black box tracking fails. This failure leads to a problem that an unauthorized user cannot be specified, or an innocent user is falsely accused.

Problem 2: Although an unauthorized decryption unit cannot read the intention of an input, the probability of correctly specifying an unauthorized user trades off with a transmission overhead. If, therefore, the transmission overhead is made efficient, the probability of correctly specifying an unauthorized user greatly decreases. The number of processing steps required for black box tracking is exponential, and hence such black box tracking is impracticable because a set of $nCk=n!/\{k!(n-k)!\}$ suspects must be checked, where n is the total number of users and k is the maximum number of conspirators in a coalition.

As described above, the conventional unauthorized user specifying methods fail in black box tracking with respect to smart unauthorized decryption units. In consideration of this problem, reference 1 (T. Matsushita and H. Imai, "Hierarchical Key Assignment for Efficient Public-key Black-Box Tracing against Self-Defensive Pirates", IEICE Information Security Research, ISEC 2006-52, pp. 91-98, July 2006) discloses an unauthorized user specifying method which can reliably execute black box tracking even with respect to a smart unauthorized decryption unit without allowing it to know the intention of an input.

The unauthorized user specifying method disclosed in reference 1 has achieved a more efficient transmission overhead. However, this method is not aimed at a smarter unauthorized decryption unit which can store past inputs. Using a smarter decryption unit which can store past inputs may make it possible to guess the intention of a current input. That is, it is necessary for the unauthorized user specifying method disclosed in reference 1 to assume that no unauthorized decryption units store any past inputs. Assume that an unauthorized decryption unit is implemented by software (a program). In this case, copies of the program are generated in a number corresponding to the number of tests conducted, and the different (copied) programs are used for the respective tests. In addition, the number of inputs to be supplied to one program is limited to one. This prevents the unauthorized decryption unit from storing past inputs, and hence can specify an unauthorized user under the above assumption.

It is, however, preferable to allow black box tracking for even a smarter decryption unit which stores past inputs and operates on the basis of the inputs to hinder the specification of an unauthorized user.

Reference 2 (A. Kiayias and M. Yung, "On Crafty Pirates and Foxy Tracers", Security and Privacy in Digital Rights Management, Revised Papers from the ACM CCS-8 Workshop DRM 2001, LNCS 2320, pp. 22-39, Springer-Verlag, 2002) discloses an unauthorized user specifying method against unauthorized decryption units which store past inputs. However, this method is of the first type described above, and hence it is necessary to greatly increase the transmission overhead. Even in this unauthorized user specifying method aimed at such unauthorized decryption units, it is preferable to reduce the transmission overhead. In addition, it is preferable that after an unauthorized user is specified, the decryption key can be updated to completely exclude the unauthorized user from the system.

As described above, the conventional unauthorized user specifying method cannot specify an unauthorized user with a small transmission overhead from a smart unauthorized decryption unit which stores input data, which is input to the unauthorized decryption unit to specify the unauthorized user, and hinders the specification of the unauthorized user on the basis of the stored input data.

BRIEF SUMMARY OF THE INVENTION

A content distribution system includes:

a content encryption unit configured to encrypt a content by using a plurality of different session keys $s_j$ (j=1, 2, ..., n), to obtain a plurality of encrypted contents;

a session key encryption unit configured to encrypt each of the session keys with a public key corresponding to a decryption key unique to each user system, to obtain a plurality of encrypted session keys;

a header information generation unit configured to generate, for a group including a plurality of user identification information items for respectively identifying a plurality of user systems to which assigned the session keys, header information which allows decryption of each encrypted session key assigned to each user system by using the decryption key unique to each user system belonging to the group, the header information including (a) the encrypted session keys, and (b) a first vector $(L_0, L_1, L_2, \ldots, L_k)$ which corresponds to a session key of the session keys and is assigned to arbitrary user identification information item u in the group, the first vector being set such that an inner product of the first vector and a second vector $(1, u, u^2, \ldots, u^k)$ concerning the user identification information item u becomes equal to $z_j u^v$ (where k is a predetermined positive integer, $z_j$ is a constant value which is one of a plurality of different constant values corresponding to the session keys and corresponds to a session key $s_j$ assigned to the user identification information item u, and v is a group identification information item assigned to the group and is an integer not less than "0" and not more than k); and a transmitter to transmit the header information and at least one of the encrypted contents to the user systems.

DETAILED DESCRIPTION OF THE INVENTION

First Embodiment

Figure 1:
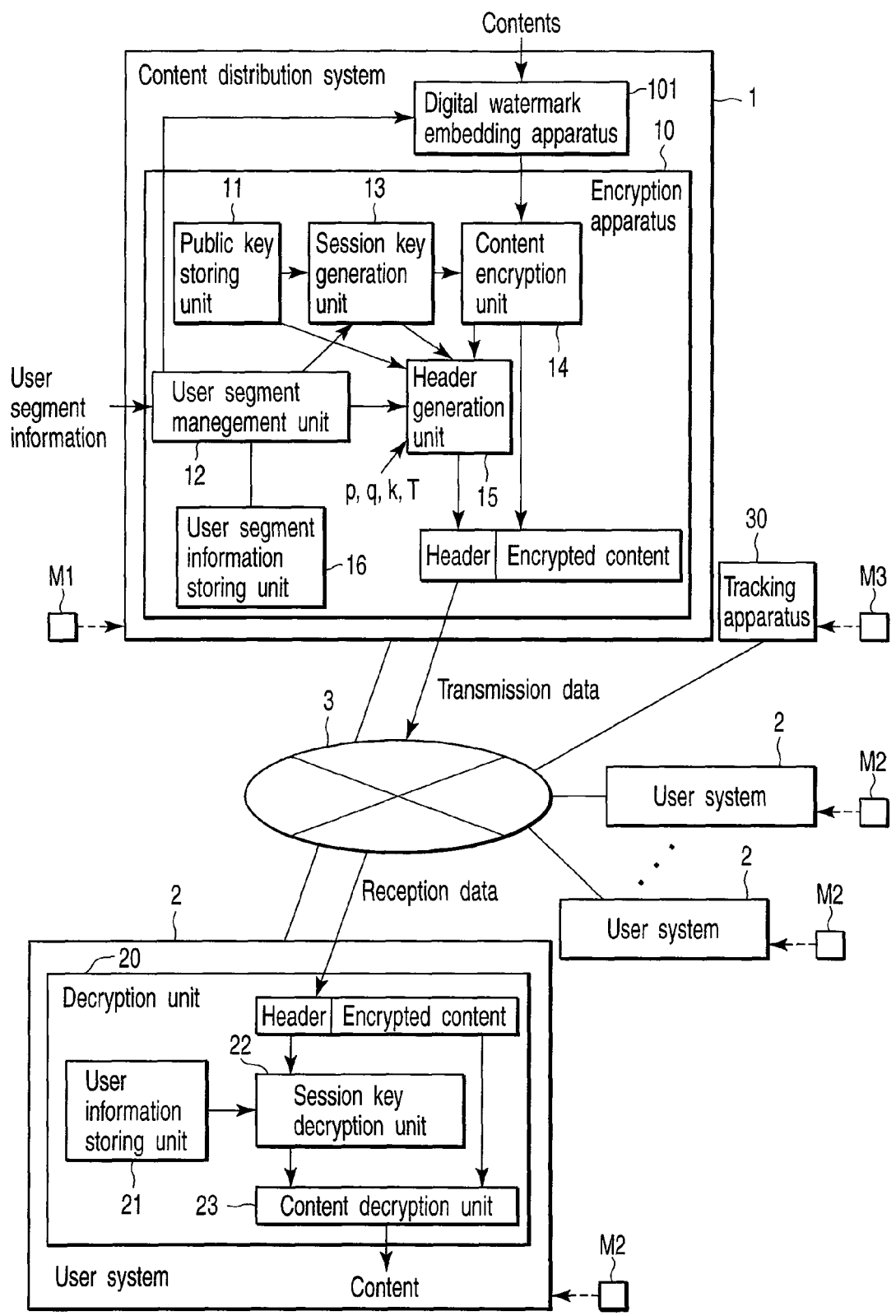
FIG. 1 is a block diagram schematically showing the arrangement of a data communication system to which a content distribution system, user systems, and the like according to the first embodiment of the present invention are applied.

The arrangement of a data communication system shown in FIG. 1, this data communication system, a content distribution system 1 including an encryption apparatus 10 and a digital watermark embedding apparatus 101 connects to n user systems 2 each having a content distribution system 1 and a decryption unit 20 through a network 3. A tracking apparatus 30 connects to the network 3.

The content distribution system 1 encrypts a content and broadcasts or multicasts the content through the network 3.

The n user systems 2 receive and decrypt the encrypted contents broadcast or multicast by the content distribution system 1 through the network 3.

Although FIG. 1 shows only one content distribution system 1, it suffices if there are a plurality of content distribution systems 1.

In addition, one node may have both the function of the content distribution system 1 and the function of the user system 2. Furthermore, it suffices to allow all nodes to perform cipher communication with each other by letting them have both the function of the content distribution system 1 and the function of the user system 2.

As shown in FIG. 1, the digital watermark embedding apparatus 101 may exist in the content distribution system 1, and the encryption apparatus 10 may have a digital watermark embedding function. There is no limitation about where the digital watermark embedding function exists as long as a content encryption unit 14 is configured to encrypt a content embedded with digital watermark information. A third party apparatus may supply a content embedded with digital watermark information to the content distribution system.

The network 3 may be a wired network or a wireless network. Alternatively, the network 3 may use both a networked network and a wireless network. In addition, the network 3 may be a bidirectional or unidirectional network. The network 3 may be offline. That is, the network 3 may be implemented by using a medium such as a DVD.

The digital watermark embedding apparatus 101 and the encryption apparatus 10 will be described next.

The digital watermark embedding apparatus 101 embeds pieces of digital watermark information respectively in input contents on the basis of information (indicating, for example, how many pieces of digital watermark information are required) from a user segment management unit 12, and outputs a plurality of digitally watermarked contents embedded with different pieces of digital watermark information. The digital watermark embedding apparatus 101 embeds digital watermark information in an input content within a range outside human perception. Once digital watermark information is embedded in a content, it is very difficult to eliminate or tamper with the digital watermark information. The digital watermark embedding apparatus 101 performs digital watermark embedding by using a known method like that disclosed in reference 3 (I. Cox, J. Kilian, T. Leighton, and T. Shamoon, "A Secure, Robust Watermark for Multimedia", Proc. Information Hiding, LNCS 1174, pp. 185-206, Springer-Verlag, 1996).

Figure 15:
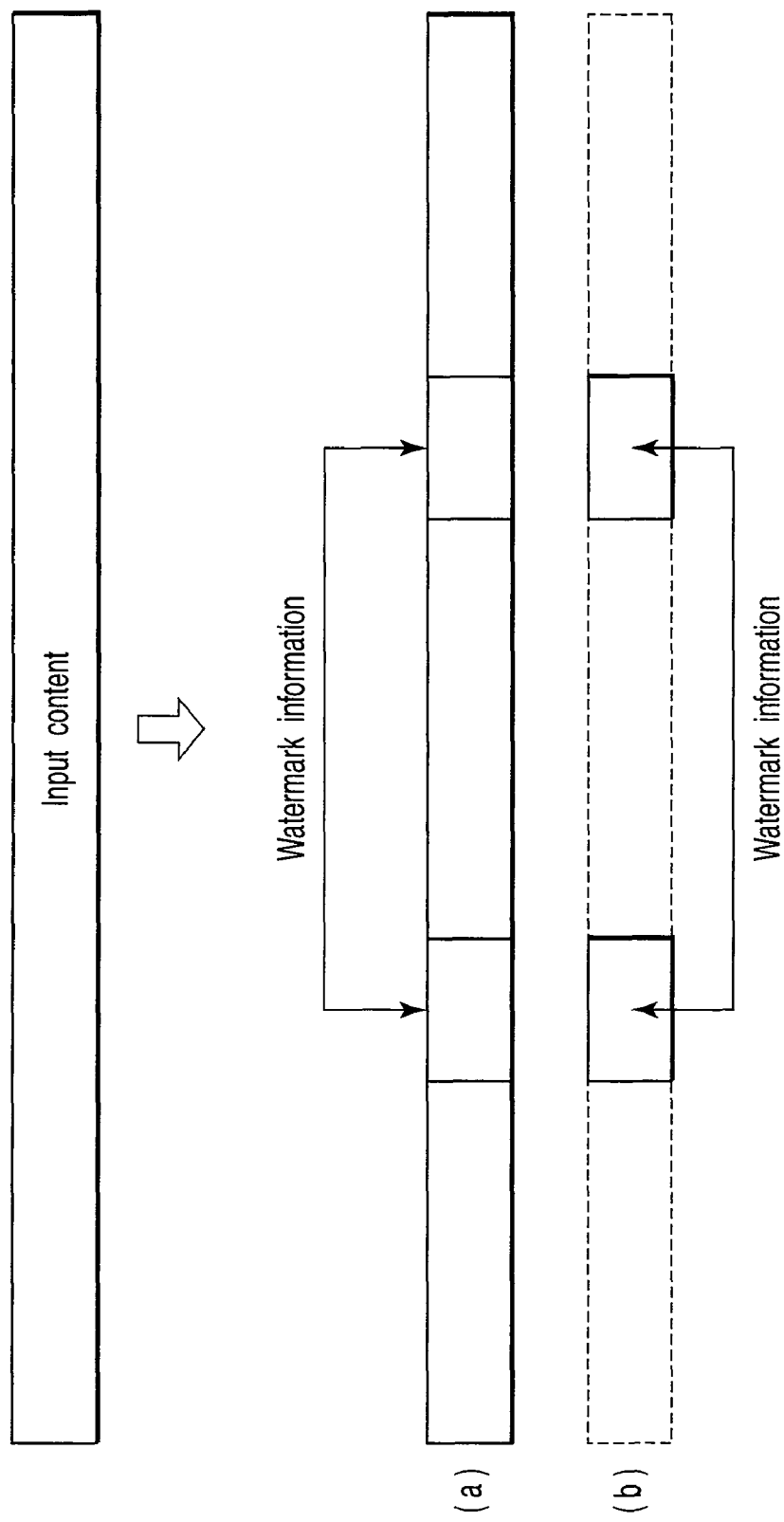
FIG. 15 is a view for explaining a method of embedding digital watermark information in a content.

When embedding different pieces of digital watermark information A and B in input contents, the digital watermark embedding apparatus 101 outputs the first content embedded with the digital watermark information A and the second content embedded with the digital watermark information B. Note that it suffices to output a plurality of (three or more) contents respectively embedded with three different pieces of digital watermark information. As shown in FIG. 15(a), it suffices to embed pieces of digital watermark information in a plurality of portions of a content and output the overall content embedded with the pieces of digital watermark information. Alternatively, as shown in FIG. 15(b), it suffices to embed pieces of digital watermark information in a plurality of portions of a content and output only portions, of the overall content, which are embedded with the pieces of digital watermark information (the portions indicated by the dotted lines in FIG. 15(b)) without outputting the remaining portions which are embedded with no digital watermark information.

The encryption apparatus 10 comprises a public key storing unit 11, the user segment management unit 12, a session key generation unit 13, the content encryption unit 14, a header generation unit 15, and user segment information storing unit 16.

The public key storing unit 11 is a memory storing a public key, which the session key generation unit 13 and the header generation unit 15 can read out.

The user segment information storing unit 16 is a memory which stores, for each of a plurality of pieces of user identification information for respectively identifying the plurality of user systems 2, information indicating a session key, of a plurality of session keys, which can be decrypted by a user system corresponding to the user identification information, and information indicating whether the corresponding user is an invalidation object user. This embodiment divides a plurality of pieces of user identification information into a plurality of user segments and respectively associates a plurality of different session keys with the plurality of user segments. The plurality of session keys respectively correspond to a plurality of contents embedded with different pieces of digital watermark information.

Upon externally receiving user segment information containing information concerning the above user segments and information concerning invalidation object users, the user segment management unit 12 stores the user segment information in the user segment information storing unit 16. The user segment management unit 12 also outputs necessary information to the header generation unit 15, session key generation unit 13, and digital watermark embedding apparatus 101 on the basis of the information stored in the user segment information storing unit 16.

The session key generation unit 13 generates a plurality of session keys on the basis of the public key in the public key storing unit 11.

The content encryption unit 14 generates a plurality of encrypted contents by encrypting a plurality of contents respectively embedded with different pieces of digital watermark information, which are obtained from the digital watermark embedding apparatus 101, on the basis of the session keys generated by the session key generation unit 13. Note that each encrypted content can be decrypted on the basis of a corresponding session key.

The header generation unit 15 generates header information on the basis of a public key, a session key (information on which it is based), invalidation object user information (if there is an invalidation object user), other necessary parameters (parameters p, q, k, and T in the case to be described later), and the like.

More specifically, the header generation unit 15 generates an encrypted session key and two kinds of header information. The header generation unit 15 generates an encrypted session key by encrypting a session key with a public key.

The first header information corresponds to a group including user systems belonging to a plurality of user segments to which different session keys are made to respectively correspond. That is, the group includes both a user system (having user identification information) from which a content embedded with one of a plurality of different pieces of digital watermark information can be obtained and a user system (having user identification information) from which a content embedded with another piece of digital watermark information can be obtained, and further includes a user system (having user identification information) from which a content embedded with still another piece of digital watermark information can be obtained.

The first header information includes (a) a plurality of encrypted session keys obtained by encrypting the respective session keys and (b) a first vector $(L_0, L_1, L_2, \ldots, L_k)$ corresponding to a session key assigned to arbitrary user identification information u in the group.

The first vector is set to make the inner product of the first vector and a second vector $(1, u, u^2, \ldots, u^k)$ associated with the user identification information u become equal to $z_j u^v$, where k is a predetermined positive integer, $z_j$ is a constant value, of a plurality of constant values corresponding to a plurality of session keys, which corresponds to a session key $s_j$ assigned to the user identification information u, and v is group identification information to the group and is an integer equal to or more than "0" and equal to or less than k.

In particular, when k' represents the maximum value (the maximum number of conspirators in a coalition) set in advance with respect to the number of pieces of unauthorized user identification information and k and k' satisfy $k=2k'-1$, the first vector is set to make the inner product of the first and second vectors:

$$\sum_{i=0}^{2k'-1} L_i u^i$$

become equal to $zu^{v \bmod 2k'}$.

Note that an encrypted session key can be decrypted on the basis of a decryption key unique to each user system, and a session key that can be decrypted differs depending on to which user segment the user system belongs (which session key assigned to the user segment to which the user system belongs).

The second header information corresponds to a group including only user systems belonging to a user segment assigned with a given session key. That is, the user systems belonging to the group obtain contents embedded with the same digital watermark information. The second header information includes an encrypted session key obtained by encrypting the session key with a public key. Note that the second header information does not include any value based on a value $L_i$ described above. Note however that the second header information may include a value based on the value $L_i$ described above.

Assume that the content distribution system 1 comprises various units as needed, e.g., a communication interface for header information and encrypted contents, a unit which stores contents, a unit which inputs contents, and a decryption key generation unit (not shown). When transmitting the respective pieces of header information to corresponding user systems, the content distribution system 1 preferably transmits the respective pieces of header information while sharing a common portion from the viewpoint of a reduction in data amount. However, the present invention is not limited to this. A common portion need not be shared.

In this case, the decryption key generation apparatus generates a decryption key unique to each user system and has a function of forming a tree structure by dividing a plurality of pieces of user identification information for respectively identifying a plurality of user systems into subgroups, a function of assigning different key generation polynomials and a common key generation polynomial to the respective subgroups, and a function of substituting user identification information for each user system into the key generation polynomial assigned to a subgroup to which the user identification information belongs and setting the obtained value as a decryption key unique to the corresponding user system.

Figure 13:
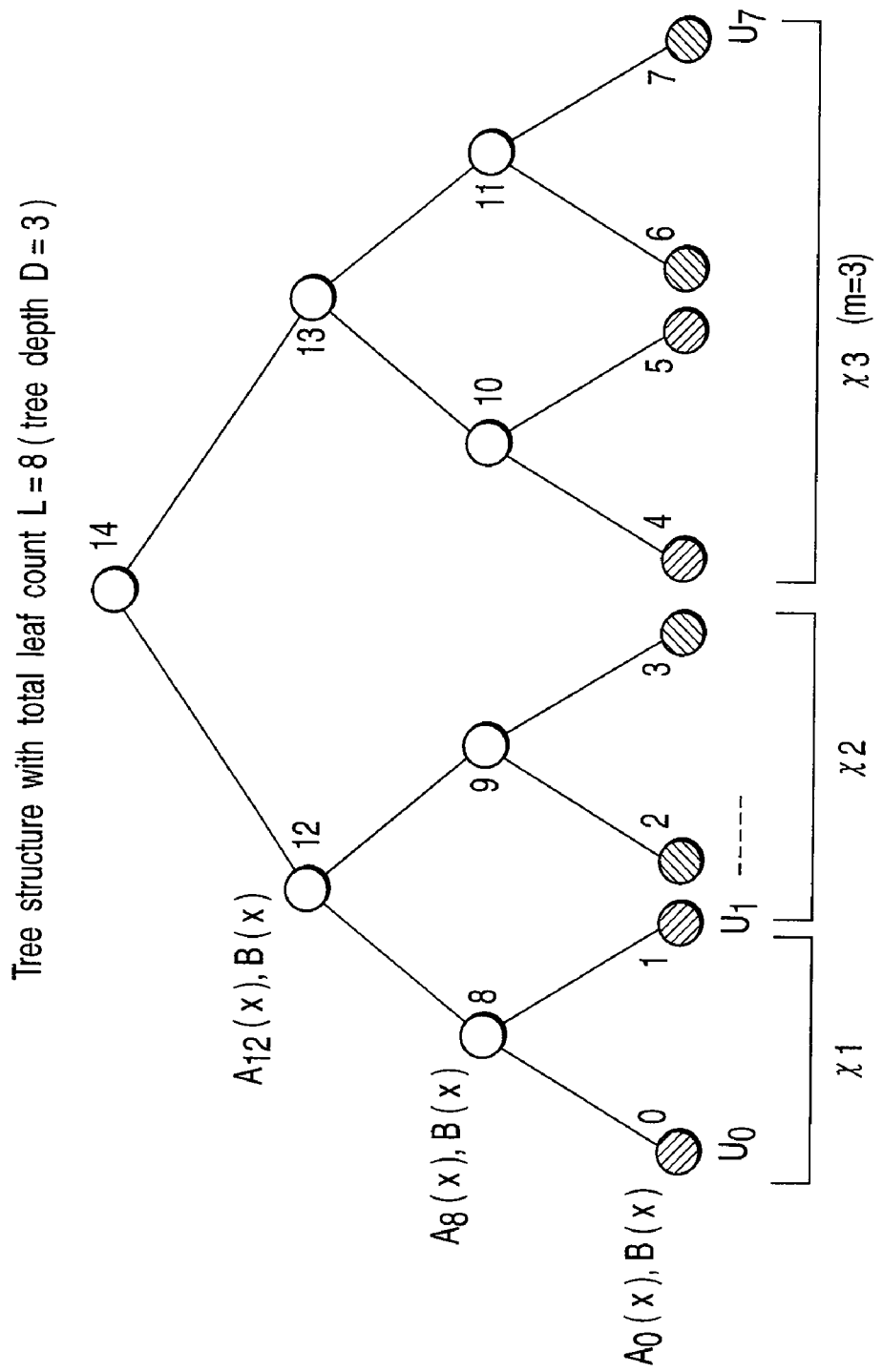
FIG. 13 is a view for explaining a tree structure.

More specifically, the decryption key generation apparatus generates a decryption key for a given user by substituting user identification information, i.e., a user ID (positive integers selected from a predetermined range (e.g., serial numbers from 1 to n)), into a key generation polynomial. In this case, as shown in FIG. 13, the apparatus divides a user set U into a plurality of subgroups, and assigns the respective subgroups to the leaves of a tree structure. FIG. 13 shows an example of a complete binary tree having eight leaves. Assume L to be the total number of leaves, D to be the depth of the tree, and T to be a tree structure including each node ID and information indicating to which leaf each subgroup is assigned.

As shown in FIG. 13, the tree structure T has IDs ("0", "1", "2", . . . , "13" in this case) allocated to the respective nodes. Assume $U_v$ to be a user set allocated to leaves having a given node v as an ancestor. Note that the word "ancestor" means a parent node, parent's parent node, parent's parent's parent node, . . . as well as a root node. Referring to FIG. 13, for example, $U_8=U_0+U_1$, where + represents a sum set. Referring to FIG. 13, the apparatus divides an entire user set U into subgroups $U_0, \ldots, U_7$.

Figure 2:
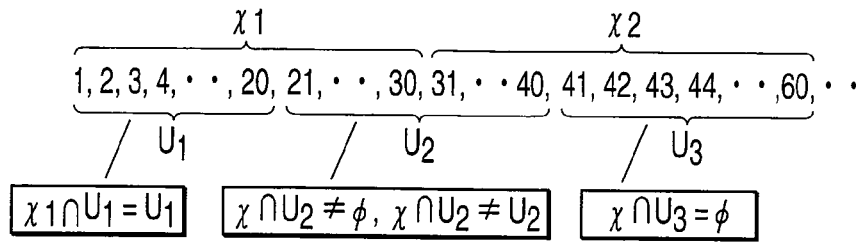
FIG. 2 is a schematic view for explaining subgroups of a user set.
Figure 3:
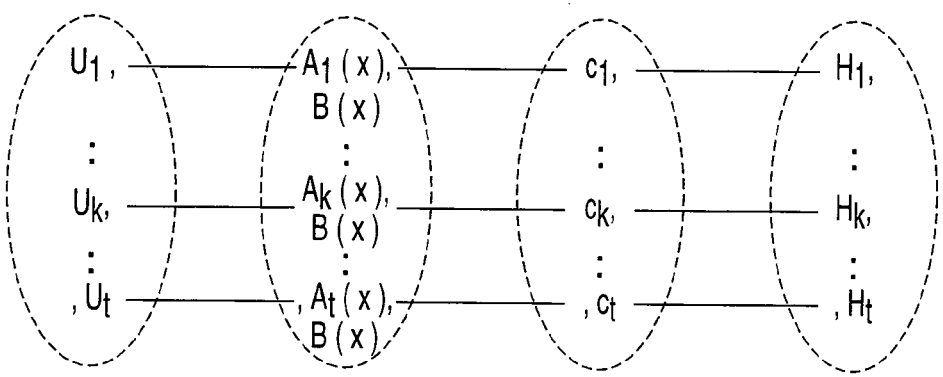
FIG. 3 is a schematic view for explaining subgroups of a user set.

FIG. 2 shows an example of subgroups $U_1$, $U_2$, and $U_3$. As shown in FIG. 3, this apparatus divides a user set into a plurality of subgroups, and assigns key generation polynomials to the respective subgroups in the following manner.

For example, this apparatus assigns the subgroup $U_1$
$A_1(x)$ and $B(x)$,
assigns the subgroup $U_2$
$A_2(x)$ and $B(x)$, and
assigns the subgroup $U_3$
$A_3(x)$ and $B(x)$.

Subsequently, the apparatus assigns the subgroup $U_i$ $A_i(x)$ and $B(x)$ in the same manner.

In this case, $A_i(x)$ represents a key generation polynomial (individual key generation polynomial) unique to the subgroup $U_i$ (in other words, a node i), and $B(x)$ represents a key generation polynomial (common key generation polynomial) common to the respective subgroups (in other words, the respective nodes). Note that the above manner of assigning is an example. For example, key generation polynomials $A_i(x)$ may be randomly and uniquely assigned without any correspondence to subgroup numbers i, or there may exist a key generation polynomial $A_j(x)$ which is not assigned to any subgroup.

In this manner, this apparatus assigns the respective subgroups different key generation polynomials and a key generation polynomial common to the respective subgroups, and generates decryption keys for the user IDs by using the key generation polynomials assigned to the subgroups to which the user IDs belong. Note that D represents the number of subgroups (excluding the root) to which the user IDs belong. For example, referring to FIG. 13, the user assigned to leaf 0 also belongs to the subgroups $U_8$ and $U_{12}$. A decryption key for the user ID is generated by using the key generation polynomials assigned to the respective subgroups.

With this operation, unlike the conventional black box tracking method disclosed in reference 4 (US 2005/0157878 A1), in which both the key generation polynomials $A_i(x)$ and $B_i(x)$ are different key generation polynomials for a each node, the present invention introduces a key generation polynomial which allows black box tracking with respect to a smart unauthorized decryption unit even if the other key generation polynomial $B(x)$ is made common to nodes, thereby reducing the size of decryption key data which the decryption unit should hold by about a little less than half.

Assume that the decryption keys obtained by substituting the user IDs assigned to the user system 2 into the key generation polynomials assigned to the subgroups to which the user IDs belong are supplied from the content distribution system 1 or a reliable third party to the user system 2 to be held in advance.

Note that the grouping method exemplified by FIGS. 13, 2, and 3 is an example, and the present invention can use various grouping methods besides this method.

According to the above description, user IDs and node IDs are positive integers (e.g., serial numbers from 1 to n) selected from a predetermined range. However, each user ID is not limited to positive integers (may be alphanumeric characters). That is, positive integers selected from a predetermined range may be uniquely assigned to a user ID comprising alphanumeric characters or the like, and a decryption key may be calculated on the basis of the positive integers uniquely assigned to the user ID and the corresponding key generation polynomial. The same applies to node IDs.

The decryption unit 20 mounted in the user system 2 will be described next.

As shown in FIG. 1, the decryption unit 20 comprises a user information storing unit 21, session key decryption unit 22, and content decryption unit 23.

The user information storing unit 21 is a memory which stores parameters necessary for decryption (parameters p, q, and k in the following case), a subgroup ID to which the self system 2 belongs, the user ID assigned to the self system 2, and a decryption key corresponding to the user ID, which the session key decryption unit 22 can read out. Note that the decryption key is the value obtained by substituting the user ID into a key generation polynomial assigned to the subgroup to which the user ID belongs.

Upon receiving an encrypted content and header information from the content distribution system 1, the session key decryption unit 22 acquires (decrypts) a session key from the header information on the basis of the decryption key in the user information storing unit 21.

The content decryption unit 23 decrypts the encrypted content received from the content distribution system 1 on the basis of the session key acquired (decrypted) from the session key decryption unit 22.

Assume that the user system 2 comprises various devices as needed, e.g., a communication interface which receives an encrypted content and header information from the content distribution system 1, a device which stores the content, and a device which displays the content.

Figure 4:
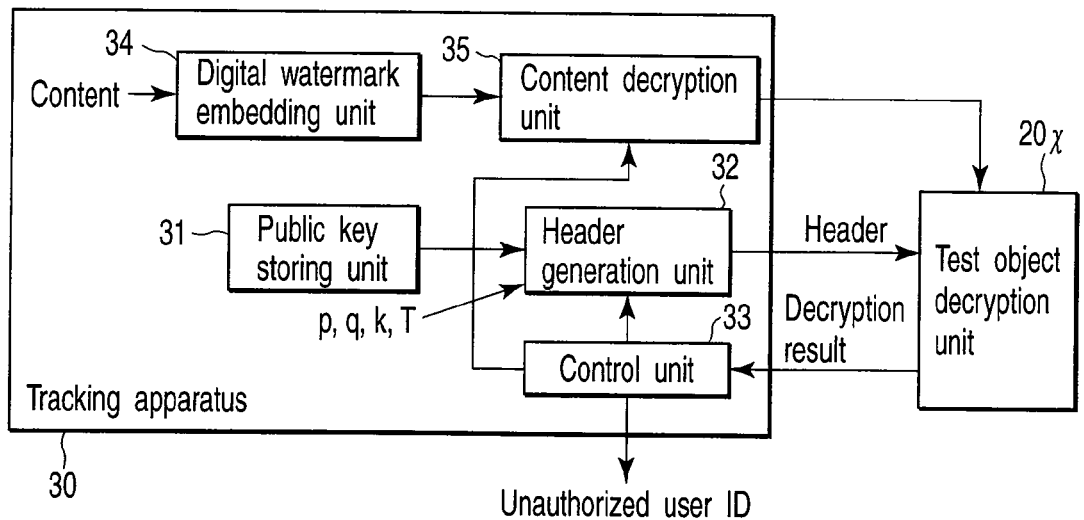
FIG. 4 is a block diagram schematically showing the arrangement of a tracking system.

The tracking apparatus 30 will be described next with reference to FIG. 4.

The tracking apparatus 30 comprises a public key storing unit 31, a header generation unit 32, a digital watermark embedding unit 34, a content decryption unit 35, and the control unit 33. Note that the digital watermark embedding unit 34 need not always be included in the tracking apparatus 30, and the digital watermark embedding function may exist anywhere as long as the content decryption unit 35 is configured to encrypt a content embedded with digital watermark information. This system may be configured such that the content decryption unit 35 receives a content embedded with digital watermark information from an apparatus located outside the tracking apparatus 30.

The content decryption unit 35 also receives a plurality of types of contents respectively embedded with different pieces of digital watermark information.

The content decryption unit 35 has a function of generating a plurality of encrypted contents by encrypting the plurality of types of contents by using session keys corresponding to the respective contents and a function of inputting the plurality of types of encrypted contents to a test object. As in the above content distribution system, a plurality of different session keys are associated with the plurality of types of contents. In addition, a plurality of session keys are respectively assigned to a plurality of user segments.

The public key storing unit 31 is a memory which stores a public key, which the header generation unit 32 can read out.

The header generation unit 32 has a function of generating header information in accordance with the user segment to which each user identification information (each user system) belongs, which is designated by the control unit 33, on the basis of the public key and other necessary parameters (for example, parameters p, q, k, and T in this case) and a function of inputting the header information to a test object. Note that a session key (information on which it is based) may be generated by the control unit 33 and designated for the header generation unit 32, or may be generated by the header generation unit 32 and notified to the control unit 33. In addition, header information is generated so as to contain a value based on the above value $L_i$.

The control unit (specifying means) 33 controls the overall tracking apparatus 30, and has a function of specifying, for example, with respect to a given user segment of a plurality of user segments, the unauthorized user or users (user identification information) of one or a plurality of user systems, based on which the test object user systems are designated, on the basis of the relationship between a plurality of pieces of header information generated while the number of user systems belonging to the user segment is increased from "0" one by one and the decryption result acquired when each piece of header information is input.

For example, the control unit 33 has a function of designating, to the header generation unit 32, a set (first user segment $\chi 1$) of pieces of user identification information (user systems) which can decrypt the first content embedded with digital watermark information A and a set (second user segment $\chi 2$) of pieces of user identification information (user systems) which can decrypt the second content embedded with digital watermark information B, a function of receiving the content decrypted by a test object decryption unit $20\chi$ and checking whether the content is the first or second content, and a function of specifying the user identification information of an unauthorized user on the basis of the overall determination results obtained by repeating similar processing while increasing the number of pieces of user identification information belonging to the first user segment $\chi 1$ one by one.

The control unit 33 specifies the user identification information of an unauthorized user on the basis of which one of a plurality of types of encrypted contents input to the test object decryption unit $20\chi$ is decrypted (e.g., which one of the pieces of digital watermark information A and B is embedded in a decrypted content). The operation of the control unit 33 is not limited to this case. In a case wherein a session key itself is a content, the control unit 33 may input only the session key to the test object decryption unit $20\chi$ and determine the decryption result on the session key which is obtained by the test object decryption unit $20\chi$ (determine which digital watermark information is embedded).

The tracking apparatus 30 may be included in, for example, the content distribution system 1, or may be an apparatus independent of the content distribution system 1 and have a function of connecting to the network 3. The tracking apparatus 30 needs not always have a function of connecting to the network 3.

Figure 5:
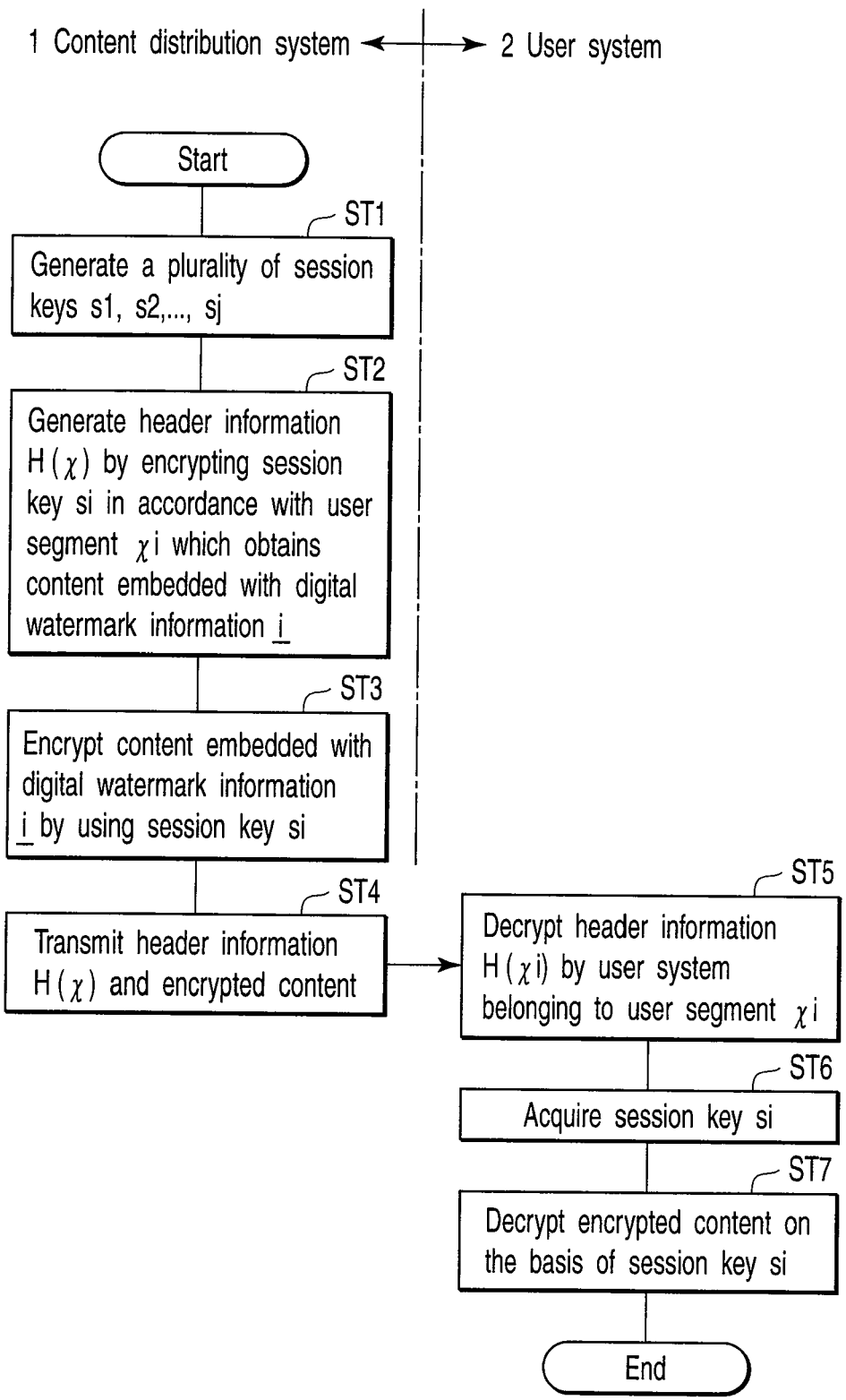
FIG. 5 is a flowchart for explaining the overall operation of the data communication system.

The operation of the network communication system having the above arrangement will be described next. FIG. 5 is a flowchart for explaining the overall operation of the system.

Assume that unique user identification information (user ID) is assigned to each user system 2.

The content distribution system 1 generates a plurality of session keys s1, s2, . . . , sj (step ST1), and generates header information $H(\chi)$ by encrypting a session key si (i=1, 2, . . . , j) in accordance with a user segment $\chi i$ which obtains a content embedded with digital watermark information i (i=1, 2, . . . , j) (step ST2).

The content distribution system 1 then encrypts a content embedded with the digital watermark information i by using the session key si (step ST3), and broadcasts or multicasts the obtained encrypted content upon adding the above header information to it (step ST4).

It suffices to execute steps ST2 and ST3 in the reverse order to that described above or simultaneously execute them. In addition, if a session key is not changed for each operation, step ST1 is sometimes omitted (the previous session key is used).

Upon receiving the header information/encrypted content, on the basis of the self user ID and the subgroup ID, each user system 2 decrypts the header information in accordance with a relationship with the user segment $\chi i$ which obtains the content embedded with the digital watermark information i (step ST5). That is, if the user system 2 belongs to the user segment $\chi i$ which obtains the content embedded with the digital watermark information i, the user system 2 acquires the session key si in the decryption processing in step ST5 (step ST6), and decrypts the encrypted content by using the session key si (step ST7).

As will be described in detail later, the content distribution system 1 generates header information in accordance with the user segment $\chi i$ which obtains the content embedded with the digital watermark information i, and hence can perform flexible control as to which user obtains a content embedded with which digital watermark information.

A key generation phase to be executed in advance, an encryption phase in step ST2, and a decryption phase in steps ST5 and ST6 will be described in detail next.

The parameters will be defined first.

Let n be the total number of users, and k is the maximum number of conspirators in a coalition.

Assume that p and q represent prime numbers, p−1 is divisible by q, and q is equal to or more than n+2k−1.

Assume that $Zq=\{0, 1, \ldots, q-1\}$.

Assume that $Zp^* = \{1, \ldots, p-1\}$.

Assume Gq to be a subgroup of $Zp^*$ and a multiplicative group having an order q, and g to be a generator of Gq.

Assume U ($U \subset Zq - \{0\}$) to be a set (to be referred to as a user set hereinafter) of the user IDs (user identification information) of all users. Note that $Zq-\{0\}$ indicates the value obtained by removing $\{0\}$ from Zq.

The values of p, q, and g are disclosed.

Assume that calculation is to be performed on $Zp^*$ unless otherwise specified. Note that Gq is not limited to the above and may be an additive group of points of an elliptic curve over a finite field. This applies to each of the following embodiments.

(Key Generation Phase)

This embodiment divides the user set U (user group) including a plurality of user IDs for respectively identifying a plurality of user systems into a plurality of subgroups. The embodiment uses a binary tree structure with the respective subgroups being assigned to leaves. More specifically, key generation polynomials are assigned to the respective nodes through which paths extend from the root of the binary tree to a plurality of leaves. This hierarchizes the key generation polynomials into multiple levels. The following exemplifies the case using the binary tree structure. However, the present invention is not limited to this. The number of branches may not be specifically limited, and one tree structure may include nodes with different numbers of branches. In addition, the numbers of nodes (the numbers of levels) through which paths extend from the root to all the leaves need not be the same, and leaves may exist at different levels.

Figure 14:
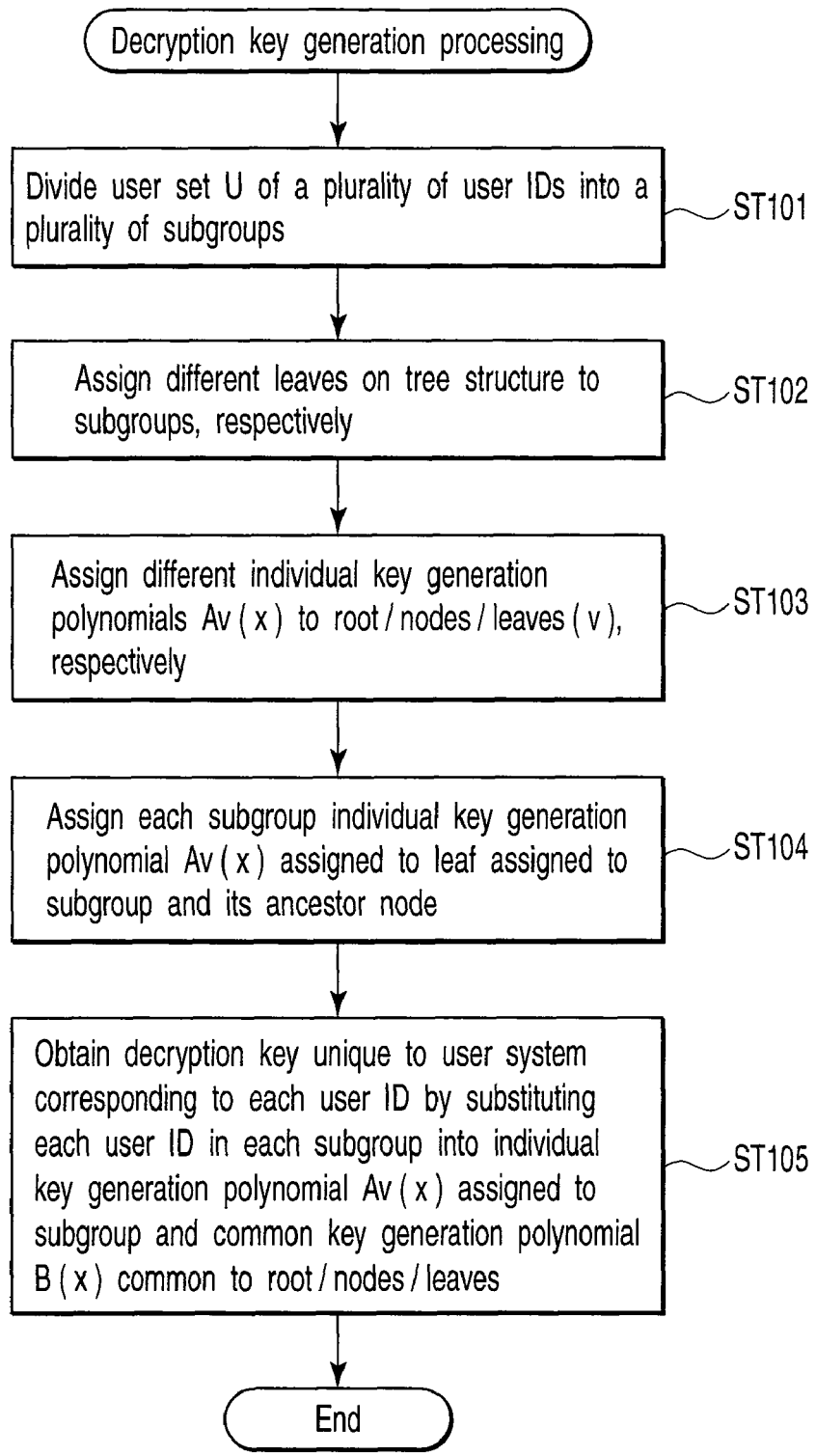
FIG. 14 is a flowchart for explaining decryption key generation processing operation.

Decryption key generation processing for a user system corresponding to public key and each user ID will be described below. Note that the flowchart shown in FIG. 14 shows decryption key generation processing for user systems corresponding to the respective user IDs.

The content distribution system 1 divides the user set U into L or less subsets (subgroups) having no common element (ST 101). For the sake of simplicity, assume that the number of subgroups is L, and L is the number expressed by the power of 2. The content distribution system 1 generates a complete binary tree with the total number of leaves being L and the depth of the tree being represented by $D=\log_2 L$, and assigns the L subgroups to different leaves (ST102). In the following description, T represents a tree structure including information indicating which subgroups are assigned to which leaves and the respective node IDs. T is disclosed.

On the other hand, the content distribution system 1 randomly selects parameters $a_0, \ldots, a_{2k-1}, b_0, \ldots, b_{2k-1}$ on which a public key is based from Zq. The content distribution system 1 also randomly selects $c_i$ and $\lambda_i$ from Zq with respect to each element i belonging to N. In this case, N is defined by equation (1) given below.

The content distribution system 1 then calculates a public key e. The public key e is given below:

$$e = (g, g^{\lambda_0}, \ldots, g^{\lambda_{2L-3}}, g^{a_0}, \ldots, g^{a_{2k-1}}, g^{c_0}, \ldots, g^{c_{2L-3}}) \quad (1)$$

Assume N to be a set of IDs of nodes and leaves, excluding the root, in the tree structure T. For the sake of simplicity, assume that N in a complete binary tree with the total number of leaves being L is represented as $N = \{0, \ldots, 2L-3\}$. In the case shown in FIG. 13, $N = \{0, \ldots, 13\}$.

The content distribution system 1 assigns the nodes and leaves (v) of the tree structure T individual key generation polynomials Av(x) which differ for the respective root, nodes, and leaves and a common key generation polynomial B(x) common to the respective root, nodes, and leaves (ST103). Note that there is no need to take the trouble of assigning the common key generation polynomial B(x) common to the respective root, nodes, and leaves to the respective root, nodes, and leaves.

The content distribution system 1 further assigns the respective subgroups the individual key generation polynomials assigned to the leaves and their ancestor nodes which are assigned to the respective subgroups (ST104).

Assume $U_v$ to be a user set allocated to leaves having a given node v as an ancestor. Referring to FIG. 13, for example, $U_8 = U_0 + U_1$, where + represents a sum set.

Lastly, the content distribution system 1 calculates a decryption key for user ID=u belonging to the user set (subset) $U_v$ allocated to the leaves having the node v as an ancestor node by substituting x=u into the key generation polynomials $A_v(x)$ and B(x) (ST105). In this case, the key generation polynomials $A_v(x)$ and B(x) are assigned to the subset $U_v$ to which a user u belongs, and is represented by equations (2), where $\lambda_v$ is a constant value which is unique and assigned to the node v.

$$A_v(x) = \sum_{i=0}^{2k-1} (a_{v,i} - \lambda_v b_i) x^i \bmod q \quad (2)$$

$$B(x) = \sum_{i=0}^{2k-1} b_i x^i \bmod q$$

$$a_{v,i} = \begin{cases} a_i (i \neq v \bmod 2k) \\ c_v (i = v \bmod 2k) \end{cases}$$

Assuming $U_i$ to be a user set allocated to leaves having a given node i as an ancestor and $A_i(x)$ to be an individual key generation polynomial assigned to the node i, a decryption key generation polynomial for the user set $U_i$ is given by, for example:

$$A_i(x) + \lambda_i B(x) = a_0 + c_i x + a_2 x^2 + \ldots + a_{2k-1} x^{2k-1}$$

In addition, assuming $U_j$ to be a user set allocated to leaves having a node j different from the node i on the tree structure as an ancestor, and $A_j(x)$ to be an individual key generation polynomial assigned to the node j, a decryption key generation polynomial for the user set $U_j$ is given by, for example:

$$A_j(x) + \lambda_j B(x) = a_0 + c_j x + a_2 x^2 + \ldots + a_{2k-1} x^{2k-1}$$

As described above, in the decryption key generation polynomial for the user set $U_i$ allocated to the leaves having the node i as an ancestor and the decryption key generation polynomial for the user set $U_j$ allocated to the leaves having the node j as an ancestor, the coefficients of the same order terms are constant regardless of i and j except for one or a plurality of coefficients (e.g., $c_i$ and $c_j$ in this case) unique to the root, nodes, and leaves on the tree structure.

That is, in the individual key generation polynomial $A_i(x)$ allocated to the node i and the common key generation polynomial B(x) common to the root, nodes, and leaves, at least one of the linear sums of the coefficients of the same order terms is a coefficient unique to the root, nodes, and leaves on the tree structure, and other coefficients, i.e., "mth-order coefficient of $A_i(x)$"+"mth-order coefficient of $\lambda_i B(x)$" are constant regardless of i and j.

A decryption key for user ID=u belonging to the user set $U_i$ allocated to the leaves having the node i as an ancestor is obtained by substituting "u" into "x" of the decryption key generation polynomial $A_i(x) + \lambda_i B(x)$.

In the above case, when the maximum number of conspirators in a coalition is set to k, the order of a key generation polynomial is preferably set to 2k−1 or more from the viewpoint of safety and hence is set to 2k−1. However, the present invention is not limited to this, and the order of the key generation polynomial can be set to an arbitrary value. In addition, the order of the key generation polynomial $A_i(x)$ assigned to the node i may differ from that of the key generation polynomial $A_j(x)$ assigned to the node j, and the orders of the key generation polynomials $A_i(x)$ and $B(x)$ may differ from each other. This applies to other embodiments to be described later.

Assuming $d_u$ to be a decryption key for the user of user ID=u, $d_u$ is represented by equation (3):

$$d_u = \{(u, v, A_v(u), B(u)) | v \in N, u \in U_v\} \quad (3)$$

Referring to FIG. 13, if, for example, the user u is assigned to leaf 0, du is represented by equation (4):

$$d_u = \{(u,0, A_0(u), B(u))(u,8, A_8(u), B(u))(u,12, A_{12}(u), B(u))\} \quad (4)$$

Figure 12:
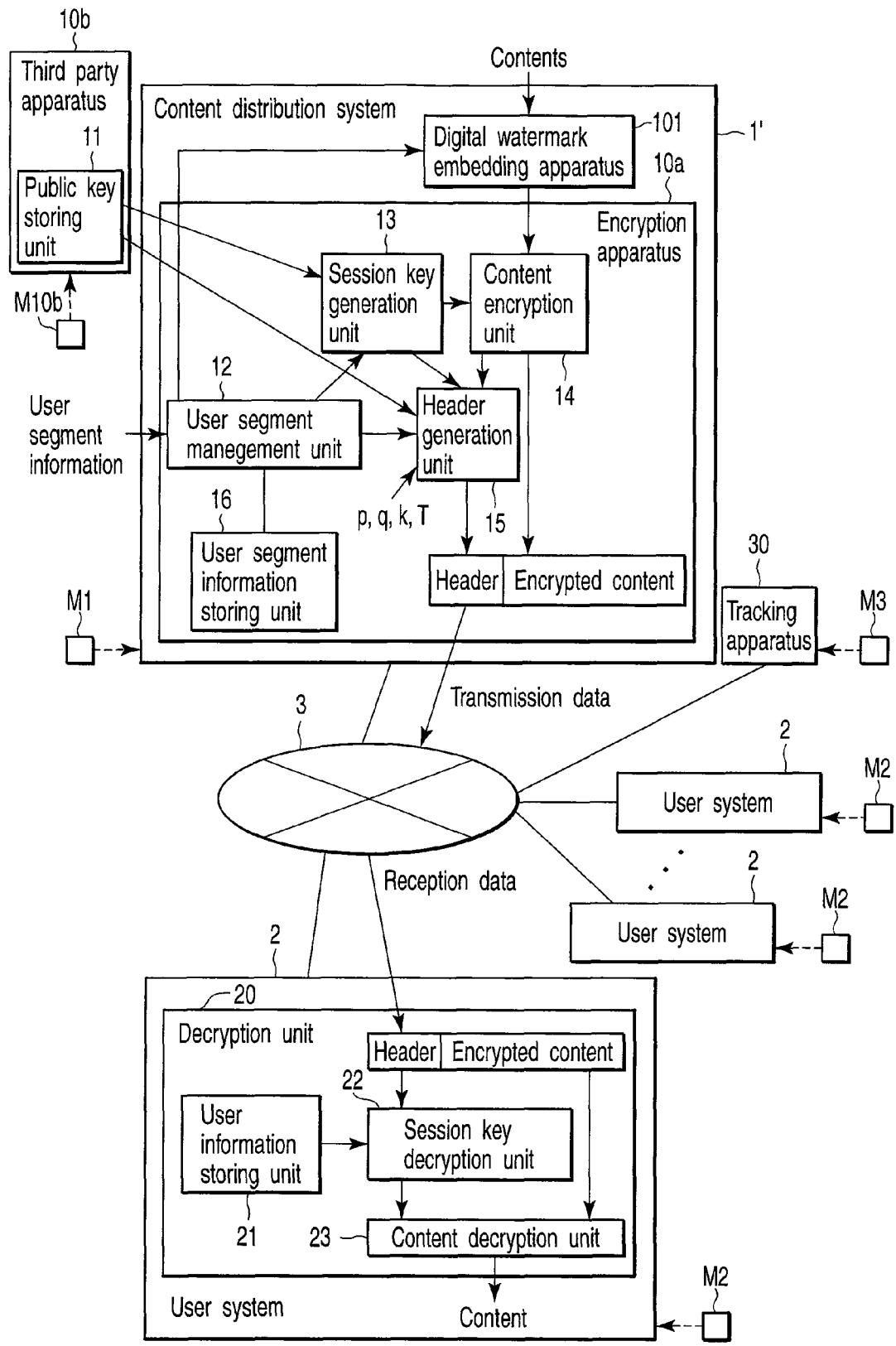
FIG. 12 is a block diagram schematically showing a modification of the data communication system.

As shown in FIG. 12, a reliable third party apparatus 10b other than the content distribution system 1 may perform the above processing in the key generation phase. According to equation (4), the individual key generation polynomial assigned to the root node (node v="14") is not assigned to the subgroup of leaf 0. However, it suffices to assign the subgroup of leaf 0 the individual key generation polynomial assigned to the root. In this case, a decryption key (u, 14, $A_{14}(u)$, $B(u)$) using the key generation polynomial for the root is added to equation (4) representing the decryption key for the user of user ID=u. In addition, it suffices even if there is a node assigned with no individual key generation polynomial. In this case, in calculating the public key e, there is no need to generate corresponding $c_i$ and $\lambda_i$. These apply to each of the following embodiments.

(Encryption Phase)

The session key generation unit 13 of the content distribution system 1 randomly selects information s on which a session key is based from Gq and zi from Zq on the basis of information (information indicating how many pieces of digital watermark information are required) from the user segment management unit 12. A set of pieces of user identification information (user systems) which obtains contents embedded with the digital watermark information i is defined as a user segment $\chi i$.

The operator (or an external third party) of the content distribution system 1 divides the user set U into a plurality of user segments, and inputs information concerning the user segments to the user segment management unit 12. (The user segment information management unit stores the input information.) The session key generation unit 13 generates pieces of information which are assigned to the respective user segments and on which a plurality of session keys are based on the basis of inputs from the user segment management unit 12, and supplies the generated pieces of information to the header generation unit 15. The header generation unit 15 respectively assigns the different session keys to the user segments. For example, the header generation unit 15 assigns the session key $s_1$ to the first user segment $\chi 1$, and the session key $s_2$ to the second user segment $\chi 2$. The session key generation unit 13 may perform this assignment. For the sake of simplicity, assume that in the following description, the header generation unit 15 will mainly perform the above processing.

Figure 16:
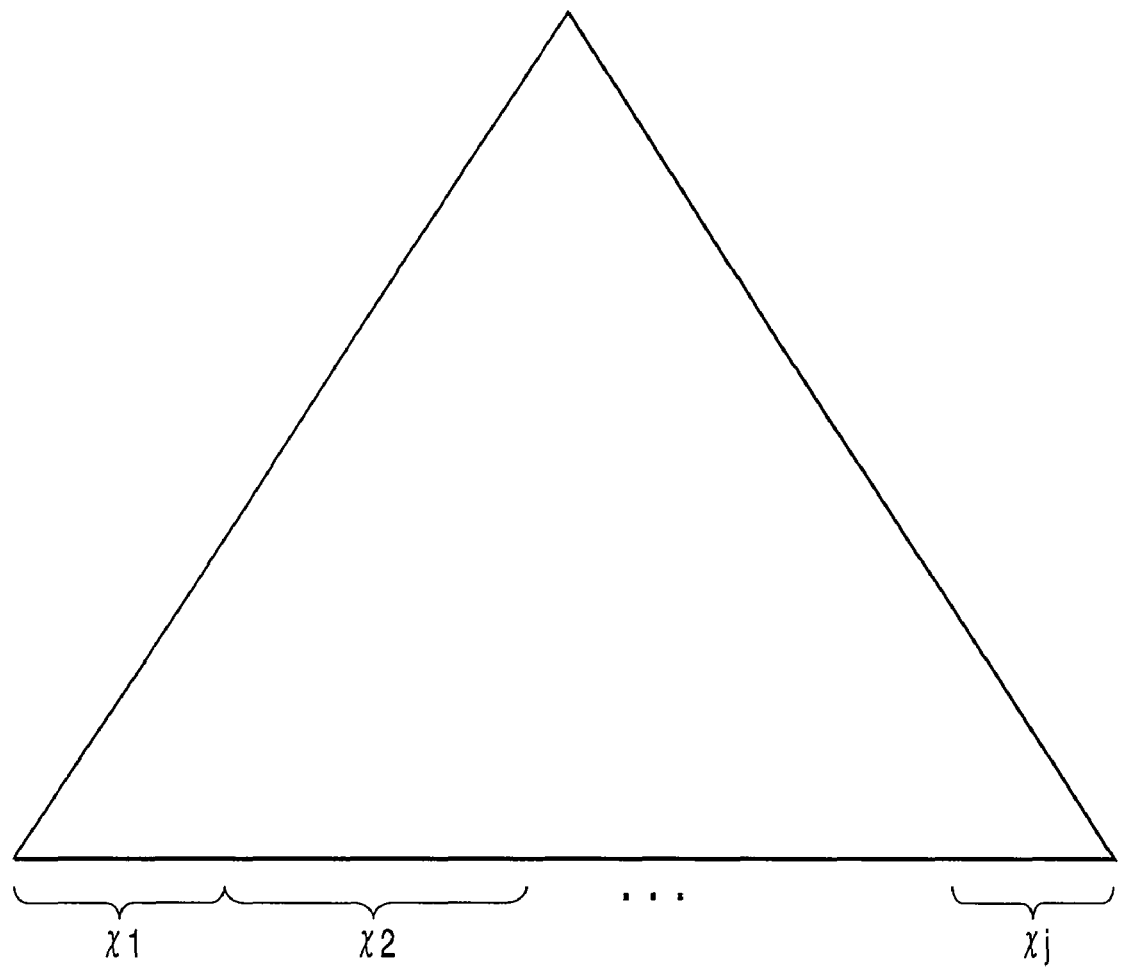
FIG. 16 is a view for explaining a plurality of user segments in a user set.

As shown in FIG. 16, the header generation unit 15 determines a plurality of user segments $\chi 1, \chi 2, \ldots, \chi j$ from the user segment U, and selects $\log_2 L+1$ node IDs including at least one leaf ID and satisfying the following two conditions.

Note that in the following description, $\log_2 L$ is sometimes expressed as $\beta$.

Condition 1: When selected nodes are represented by $v_0, \ldots, v_\beta$, a set sum $Uv_0+, \ldots, +Uv_\beta$ is equal to the user set U.

Condition 2: Equation E1 or inequality E2 is satisfied.

$$\chi i \cap Uvj = Uvj \quad (E1)$$

Equation E1 is not satisfy for any i($1 \leq i \leq m$), and $$|Uv_j \backslash Vv_j| \leq 2k \quad (E2)$$

In this case, the following definition is given:

$$Vv_j = \cup_{1 \leq \tau \leq \log_2 L+1, \tau \neq j} Uv_\tau \quad (E3)$$

Referring to FIG. 13, three user segments (m=3) $\chi 1, \chi 2$, and $\chi 3$ are determined, and four node IDs ("0", "1", "9", and "13") are selected.

Figure 6:
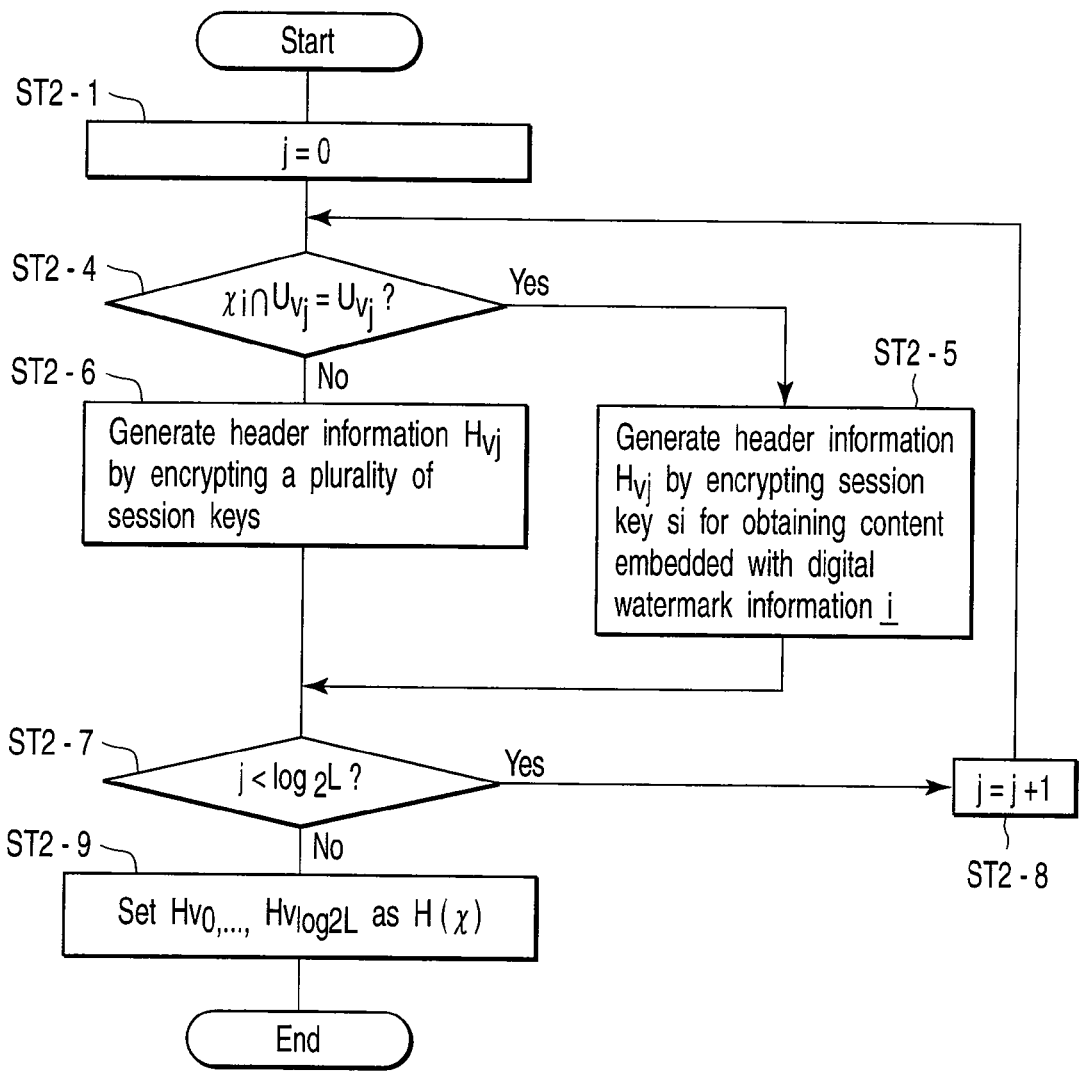
FIG. 6 is a flowchart for explaining operation in the encryption phase.

The header generation unit 15 then selects random numbers $r_0$ an $r_1$ and repeats the following processing for $0 \leq j \leq \log_2 L$ (=$\beta$), i.e., each of the selected nodes (a group comprising one or a plurality of subgroups belonging to each node) to calculate pieces of header information $Hv_0, \ldots, Hv_\beta$ with respect to each of the selected nodes (ST2-1 to ST2-8 in FIG. 6).

The header generation unit 15 determines whether a product set of sets $\chi i$ and $Uv_j$ is $Uv_j$ (ST2-4).

The following is a case wherein a product set of $\chi i$ and $Uv_j$ is $Uv_j$. In this case, all the users belonging to $Uv_j$ obtain contents embedded with one piece of digital watermark information i. For example, $U_1$ in FIG. 2 corresponds to this case. The header generation unit 15 calculates $Hv_j$ according to equation (5) given below (ST2-5):

$$H_{v_j} = (\bar{h}_{v_j}(=g^{r_{v_j}}), \hat{h}_{v_j}(=g^{\lambda_{v_j} r_{v_j}}), h_{v_j,0}, \ldots, h_{v_j,2k-1}), \quad (5)$$

$$h_{v_j,t} = \begin{cases} g^{a_t r_{v_j}} & (t \neq v_j \bmod 2k) \\ s_i g^{c_{v_j} r_{v_j}} & (t = v_j \bmod 2k, \chi_i \cup Uv_j = Uv_j) \end{cases}$$

$$s_i = sg^{z_i}$$

where s and $z_i$ are randomly selected from $G_q$ and $Z_q$, respectively. Assume that when the following processing (processing for a node satisfying inequality E2), $r_{vj}=r_0$. Otherwise, $r_{vj}$ is $r_0$ or $r_1$.

For example, it suffices to perform only the determination in step ST2-4 and in step ST2-6 in advance. If it is clear that there is no chance that the result in step ST2-4 is otherwise (ST2-4; NO), it suffices to substitute either $r_0$ or $r_1$ into r. Otherwise, $r_0$ is substituted into r.

A case wherein the result in step ST2-4 is otherwise will be described (ST2-4; NO). In this case, at least one of the users belonging to $Uv_j$ does not belong to the set $\chi i$, and at least one of them belongs to the set $\chi i$. For example, this case corresponds to $U_2$ in FIG. 2.

The header generation unit 15 sets, as $Uv_j-Vv_j=\{\alpha_1, \ldots, \alpha_m\}$, the set obtained by removing user IDs belonging to a user set $Vv_j$ from a group of user IDs belonging to a user set $Uv_j$.

$Vv_j$ will be described below. Assume that with regard to the respective selected nodes $v_j$, all the users belonging to $Uv_j$ have no common element. According to definition expression (E3), since $Uv_j-Vv_j=Uv_j$, this case is equivalent to expressing a group of user IDs belonging to the user set $Uv_j$ as $\{\alpha_1, \ldots, \alpha_m\}$. On the other hand, as shown in FIG. 13, if k users belonging to $U_1$ belong to $\chi 1$ and the remaining k users belong to $\chi 2$, for example, nodes 0, 1, 9, and 13 can be selected. Instead of this, nodes 0, 8, 9, and 13 can be selected. In the latter case, since $U_0$ and $U_8$ have a common element, when $\alpha_1, \ldots, \alpha_m$ are to be set, $Uv_j-Vv_j=\{\alpha_1, \ldots, \alpha_m\}$ is set. For example, $U_8-V_8=U_8-(U_0+U_9+U_{13})=U_1$. As described above, the symbol $Vv_j$ is defined to handle the case wherein two sets $Uv_j$ have a common element.

If $2k-m>0$, the header generation unit 15 then randomly selects $\alpha_{m+1}, \ldots, \alpha_{2k}$ from $Zq-(U+\{0\})$. Note that $Zq-(U+\{0\})$ indicates the value obtained by removing a sum set of U and $\{0\}$ from Zq.

The header generation unit 15 obtains elements $L_0, \ldots, L_{2k-1}$ of Zq which satisfy equation (8a) with respect to $1 \leq t \leq 2k$. If a number M of elements $\alpha t$ satisfying $\alpha t \in \chi i$ in equation (8a) is less than 2k, conditional expressions may be added to equation (8a) to make the number of conditional expressions become equal to 2k (the number of elements Li) as indicated by equation (8b), or the number conditional expressions may be decreased as indicated by equation (8c). Alternatively, as will be described in the second embodiment, the number of conditional expressions may be larger than 2k.

$$\sum_{l=0}^{2k-1} L_l \alpha_t^l = z_i \alpha_t^{v_j \bmod 2k} \bmod q \ (\alpha_t \in \chi_i) \tag{8a}$$

$$\sum_{l=0}^{2k-1} L_l \alpha_t^l = \begin{cases} z_i \alpha_t^{v_j \bmod 2k} \bmod q (\alpha_t \in \chi_i), \\ z'_t \bmod q \ (\alpha_t \in Zq \setminus (U \cup \{0\})) \end{cases} \tag{8b}$$

$$\sum_{l=0}^{M-1} L_l \alpha_t^l = z_i \alpha_t^{v_j \bmod 2k} \bmod q (\alpha_t \in \chi_i) \tag{8c}$$

where $z'_t$ is an arbitrary value on Zq.

The header generation unit 15 then calculates $Hv_j$ by substituting $r_1$ into r according to equation (9) (ST2-6).

$$H_{v_j} = (\bar{h}_{v_j}(= g^{r_{v_j}}), \hat{h}_{v_j}(= g\lambda_{v_j} r_{v_j}), h_{v_j,0}, \ldots, h_{v_j,2k-1}), \tag{9}$$

$$h_{v_j,i} = \begin{cases} g^{L_i} g^{a_i r_{v_j}} & (i \neq v_j \bmod 2k) \\ sg^{L_i} g^{c_{v_j} r_{v_j}} & (i = v_j \bmod 2k) \end{cases}$$

As indicated by equations (8a), (8b), and (8c), assuming that a value $\{L_0, \ldots, L_{2k-1}\}$ concerning the user segment $\chi i$ is the first vector, a user $ID(x_w)$ belonging to the user segment $\chi i$ is set as a variable of a (2k−1)th-order polynomial, and the resultant value is the second vector $(1, x_w, x_w^2, \ldots, x_w^{2k-1})$, the value $\{L_0, \ldots, L_{2k-1}\}$ is the first vector satisfying the relationship represented by the following equation, that is, the inner product of the first and second vectors is equal to the product of the value obtained by exponentiating the user ID by a value $v_j \bmod 2k$ based on group identification information (node ID) $v_j$ of a group (selected node) belonging to the user ID and a constant zi which differs for each user segment.

$$(L_0, L_1, L_2, \ldots, L_{2k-1}) \cdot (1, x_w, x_w^2, \ldots, x_w^{2k-1}) = z_i x_w^{v_j} \bmod 2k \bmod q$$

where $x_w$ is a user ID belonging to the user segment $\chi i$.

Although the above case is based on the assumption that $m \leq 2k$, the value of m can be allowed within the range of $m \leq$ (the order of the key generation polynomial+1) by increasing the order of the key generation polynomial.

The above case uses, for a user ID, $v_j \bmod 2k$ as a value based on the group identification information (node ID) of the group (selected node) to which the user ID belongs. However, the present invention is not limited to this, and it is possible to use the value obtained by substituting $v_j$ into a function of uniquely mapping $v_j$ to a value equal to or more than 0 and equal to or less than the order of the key generation polynomial.

In the above case, $r=r_1$ even when the result obtained in step ST2-4 becomes otherwise (ST2-4; NO) twice or more. However, the present invention is not limited to this, and it suffices to prepare three or more random numbers to be substituted into r and substitute one of the different random numbers into r every time the result in step ST-4 becomes otherwise. It also suffices to introduce, in addition to the above two conditions (conditions 1 and 2), a condition that at least one node satisfying condition 2 is selected. In this case, the result in step ST2-4 becomes otherwise at least once.

In the above case, when the result in step ST2-4 becomes otherwise (ST2-4; NO), $Hv_j$ is calculated according to equation (9) (ST2-6). However, the present invention is not limited to this, and it suffices to calculate $Hv_j$ according to equation (9) even if a product set of $\chi i$ and $Uv_j$ is $Uv_j$ (ST2-4; YES), as long as the number of elements of $Uv_j$ is equal to or less than 2k (equal to or less than 2(d+1)k in the second embodiment to be described later). All those described above apply to the other embodiments to be described later.

$Hv_0, \ldots, Hv_\beta$ obtained by the above repetitive processing are set as a header $H(\chi)$ (ST2-9). In this case, a header can be calculated by using the public key e, anyone can manage the content distribution system 1.

In addition, the transmission overhead can be further reduced by grouping identical elements of the respective elements constituting $Hv_0, \ldots, Hv_\beta$ obtained by the above repetitive processing into a shared element in the header $H(\chi)$. This applies to each of the following embodiments.

Although the above case selects $\log_2 L+1$ nodes, the present invention is not limited to this, and nodes larger or smaller in number may be selected. That is, $\beta$ may be a value other than $\log_2 L$. Although the above case selects at least one leaf ID, no leaf may be selected as long as the above two conditions (conditions 1 and 2) are satisfied. These apply to each embodiment to be described below.

In the above case, there is no user who is inhibited from decrypting a content (there is no user whose decryption key is invalidated). However, using the decryption key invalidation method disclosed in reference 5 (T. Matsushita, "Black-Box Traitor Tracing Schemes for Copyright Protection", PhD Thesis, The University of Tokyo, Japan, January 2006) makes it possible to invalidate the decryption key of a specific user. This applies to each of the following embodiments.

The content encryption unit 14 encrypts the content embedded with the digital watermark information i by using the session key si, and broadcasts or multicasts the content.

(Decryption Phase)

Figure 8:
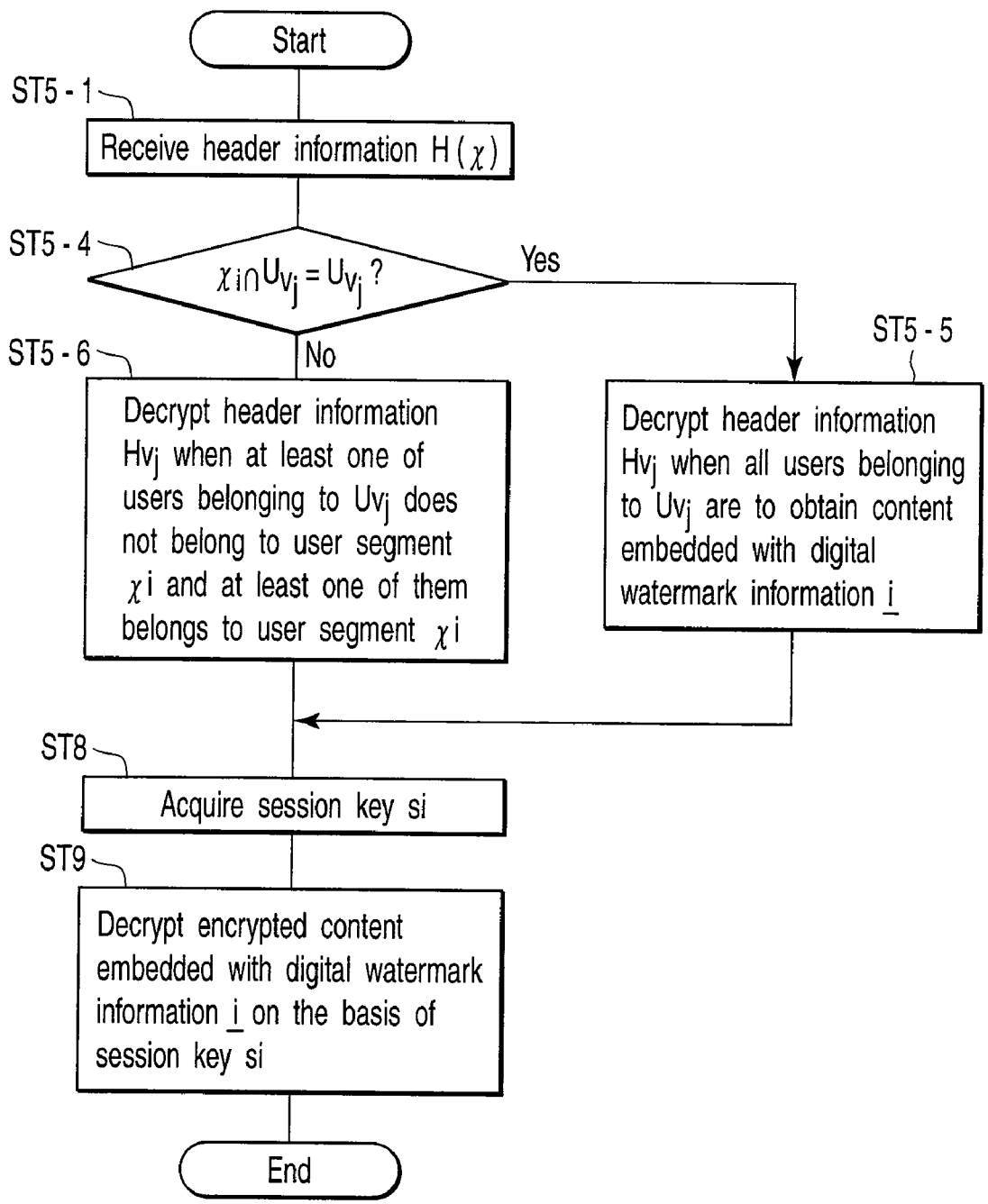
FIG. 8 is a flowchart for explaining operation in the decryption phase.

Consider the user u belonging to the group $Uv_j$ of user identification information which comprises subgroups assigned to leaves subordinate to the node $v_j$. Upon receiving the header $H(\chi)$ (ST5-1), the user system 2 of user ID=u calculates equation (10) by using $Hv_j$, as shown in FIG. 8.

$$\left( \frac{\prod_{i=0}^{2k-1} h_{v_j,i}^{u^i}}{\bar{h}_{v_j}^{A v_j(u)} \hat{h}_{v_j}^{B(u)}} \right)^{1/u^{v_j \bmod 2k}} = s' \left\{ \frac{g^{r_{v_j} \sum_{i=0}^{2k-1} a_{v_j,i} u^i}}{g^{r_{v_j}(A_{v_j}(u)+\lambda_{v_j} B(u))}} \right\}^{1/u^{v_j \bmod 2k}}$$

$$= s'$$

and further calculates the right-hand side of the above equation as follows:

$$s' = \begin{cases} s_i & (\chi_i \cap Uv_j = Uv_j), \\ s\left(g^{\sum_{i=0}^{2k-1} L_i u^i}\right)^{1/u^{v_j \bmod 2k}} & \text{(If inequality (E2) holds)} \end{cases} \quad (10)$$

$$= s_i (u \in \chi_i)$$

The result obtained by decrypting a session key from header information will be briefly described below.

The decryption result obtained by the session key decryption unit 22 of the user system 2 is selectively processed depending on whether a product set of the user segments $\chi_i$ and $Uv_j$ is $Uv_j$ (ST5-4) Note that the session key decryption unit 22 of the user system 2 does not perform this determination, and calculates equation (10) by using $Hv_j$ without changing the decryption procedure in any case.

A case wherein a product set of $\chi_i$ and $Uv_j$ is $Uv_j$ (ST5-2; YES) will be described first. This is a case wherein all the users belonging to $Uv_j$ obtain contents embedded with the same digital watermark information i. The session key decryption unit 22 performs calculation according to equation (10) (ST5-5) to obtain the session key si corresponding to the digital watermark information i (ST-8). All the users belonging to $Uv_j$ obtain contents embedded with the digital watermark information i, which are encrypted with the session key si, by using the session key si (ST-9).

A case wherein a product set of $\chi_i$ and $Uv_j$ is $Uv_j$ (ST5-4; NO) will be described next. This is a case wherein at least one of the users belonging to $Uv_j$ does not belong to the user segment $\chi_i$, and at least one of them belongs to the user segment $\chi_i$. For example, $U_2$ in FIG. 2 corresponds to this case. In this case as well, since equation (11) holds, the session key decryption unit 22 calculates the session key si according to equation (10) (ST5-3). As a result, the user systems belonging to each user segment $\chi_i$ obtain the session key si corresponding to the user segment $\chi_i$ (ST8), and obtain contents embedded with the digital watermark information i, which are encrypted with the session key si, by using the session key si (ST-9).

$$\sum_{l=0}^{2k-1} L_l u^l = z_i u^{v_j \bmod 2k} \bmod q \quad (11)$$

(Tracking Phase)

An example of a procedure for a tracking algorithm will be described next. Prior to this description, the tracking apparatus 30 and an unauthorized user as a tracking object will be briefly described. When a pirate decryption unit (unauthorized decryption unit) is confiscated, the tracking apparatus 30 specifies an unauthorized user (his/her user ID), based on which the pirate decryption unit has been illicitly generated, by black box tracking.

A pirate decryption unit is generated either on the basis of only one authorized decryption unit or on the basis of a plurality of authorized decryption units. In the latter case, the unauthorized users of decryption units will be referred to as conspirators.

A pirate decryption unit generated on the basis of only one decryption unit can use the same decryption key as that used by the decryption unit. A pirate decryption unit generated on the basis of a plurality of decryption units can use any one of the same decryption keys as those used by the plurality of decryption units. In the latter case, a session key can be obtained unless all the decryption keys corresponding to the conspirators are invalidated.

Even if a plurality of unauthorized users conspire with each other, the tracking apparatus 30 can quickly execute a test and specify one or more unauthorized users as compared with the conventional method of performing nCk tests.

(Example of Procedure)

Figure 9:
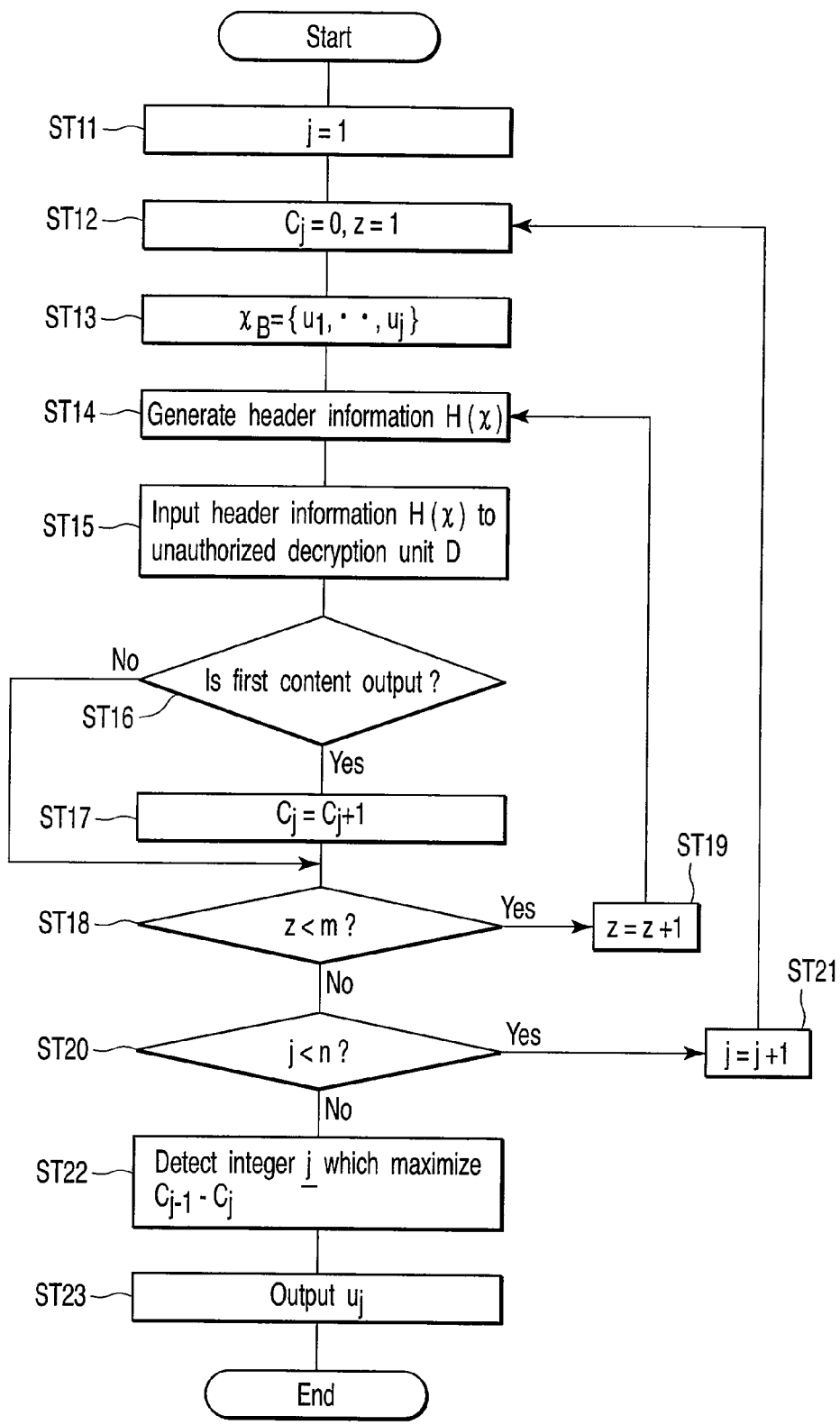
FIG. 9 is a flowchart for explaining operation in the tracking phase.

In practice, a tracking algorithm can be executed in various procedures. The present invention is not limited to the following procedure shown in FIG. 9.

When a pirate decryption unit D is confiscated, an unauthorized user is specified by the following processing.

Note that in a tree structure T, each leaf is assigned with a subgroup comprising 2k users. Assume that the respective leaf IDs are sequentially represented by 1, . . . , t from the leftmost leaf, and the elements (user IDs) of subgroups $U_1, \ldots, U_t$ are labeled as indicated by equation (13):

$$\begin{aligned} U_1 &= \{u_1, \ldots, u_{2k}\}, \\ U_2 &= \{u_{2k+1}, \ldots, u_{4k}\} \\ &\vdots \\ U_t &= \{u_{n-2k+1}, \ldots, u_n\} \end{aligned} \quad (13)$$

In this case, the numbers of elements (the numbers of users belonging to the respective leaves) of the subgroups $U_1, \ldots, U_t$ need not all be 2k. For example, the number of elements of the subgroup $U_1$ may differ from that of the subgroup $U_2$. This applies to each of the following embodiments.

The tracking apparatus 30 executes the following processing with respect to j=1, . . . , n (n: total number of users, j: user number) (ST11 to ST21). The control unit 33 sets $C_j=0$, which represents the number of times a content embedded with digital watermark information A is obtained, and also sets, as a user segment $\chi_A$, a set of users which obtains the first content embedded with the digital watermark information A. Assume that a set of users who obtain a second content embedded with digital watermark information B different from the digital watermark information A is set as a user segment $\chi_B$. The tracking apparatus 30 sets the number of tests conducted with respect to the same user segments $\chi_A$ and $\chi_B$ to "1", and repeats the following processing m times (until the number of tests conducted becomes m) (ST12). Assume that the first content embedded with the digital watermark information A is encrypted with a session key $s_A$, and the second content embedded with the digital watermark information B is encrypted with a session key $s_B$.

The control unit 33 sets user IDs belonging to the user segment $\chi_B$ as $\{u_1, \ldots, u_j\}$, and other user IDs as the user segment $\chi_B$ (ST13). Therefore, the user ID belonging to the initial user segment $\chi_B$ is $\{u_1\}$, and the user ID belonging to the initial user segment $\chi_A$ is $\{u_2, \ldots, u_n\}$. The control unit 33 controls the header generation unit 32 to generate a header $H(\chi)$ by setting the number of session keys to be encrypted to "2", i.e., $s_A$ and $s_B$ as session keys (ST14). Note that the header generation method is the same as that in the encryption phase, and a random number is selected for every operation.

When the header generation unit 32 inputs the header $H(\chi)$ and the encrypted contents (which are obtained by encrypting the first content embedded with the digital watermark information A using $s_A$ and encrypting the second content embedded with the digital watermark information B using $s_B$) to the unauthorized decryption unit D (ST15), the control unit 33 observes an output from the unauthorized decryption unit D.

At this time, the control unit 33 detects whether the unauthorized decryption unit D has output the first or second content (ST16). If the unauthorized decryption unit D has output the first content (ST16; YES), the control unit 33 increments $C_j$ by "1" (ST17). If the unauthorized decryption unit D has output the second content (ST16; NO), the control unit 33 does not change the value of $C_j$.

Assume that session keys themselves are contents, i.e., the session key $s_A$ is embedded with the digital watermark information A, and the session key $s_B$ is embedded with the digital watermark information B. In this case, it suffices to input only the header to the unauthorized decryption unit D, increment $C_j$ by "1" if the content embedded with the digital watermark information A is decrypted, and keep the value of $C_j$ unchanged otherwise.

In any case, when completing the updating of $C_j$, the control unit 33 determines whether a test count z is less than m (ST18). If the test count z is less than m, the control unit 33 increments z by "1" (ST19). The process returns to step ST14 to repeat the test.

Upon determining in step ST18 that the test count z becomes equal to m, the control unit 33 determines whether a user number j belonging to the user segment $\chi_B$ is less than a total user count n (ST20). If the user number j is less than n, the control unit 33 increments j by "1" (ST21). The process then returns to step ST12 to repeat the test.

Upon determining in step ST20 that the user number j of the user $u_j$ belonging to the user segment $\chi_B$ coincides with the total user count n, the control unit 33 finishes the test.

When calculating $C_{j-1} - C_j$ obtained with respect to j=1, . . . , n and detecting an integer j which maximizes $C_{j-1} - C_j$ (ST22), the control unit 33 specifies $u_j$ as an unauthorized user and outputs its user ID (ST23).

Figure 10:
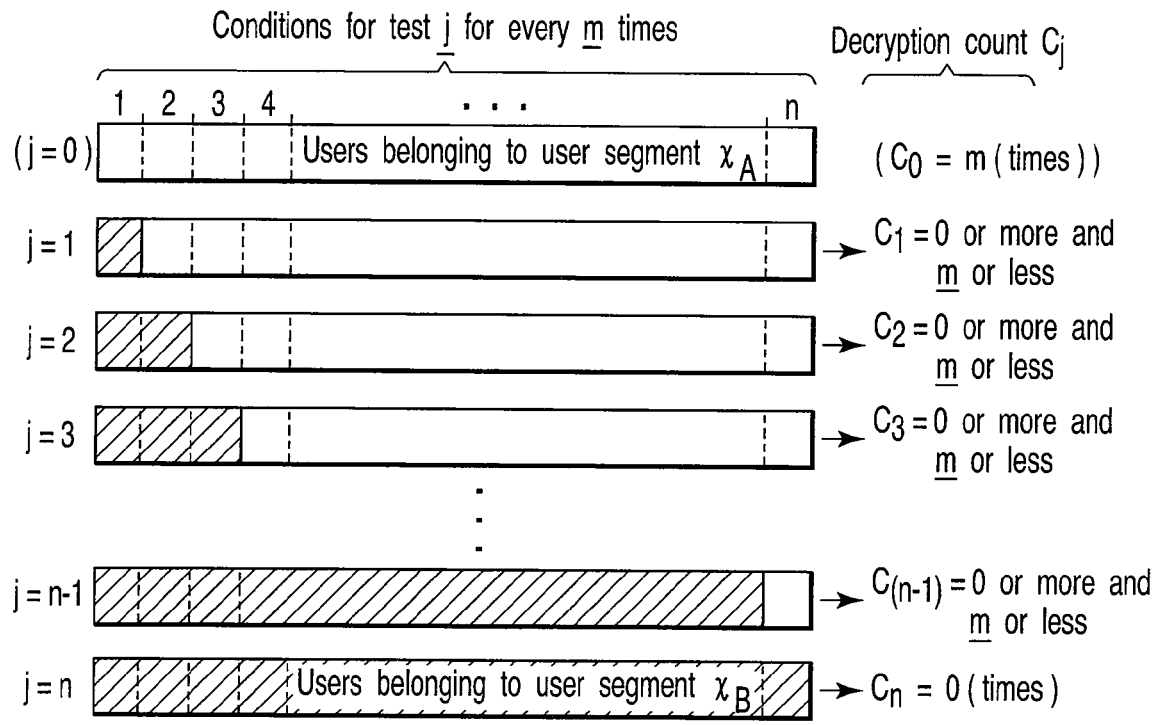
FIG. 10 is a schematic view for explaining an outline of a test.
Figure 11:
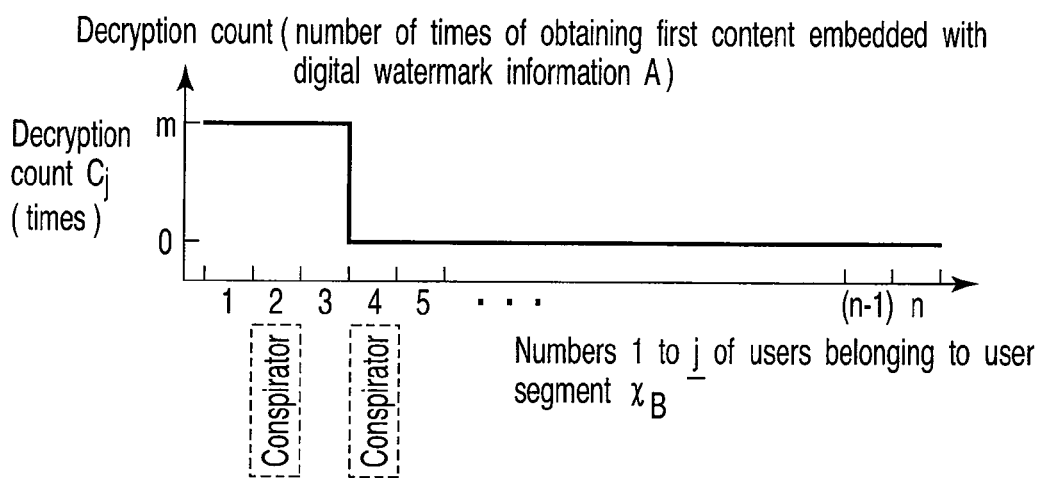
FIG. 11 is a schematic view for explaining a test result.

As shown in FIGS. 10 and 11, this tracking method increases the number of unauthorized user candidates belonging to the user segment $\chi_B$ one by one, and tests whether each unauthorized user candidate outputs the second content embedded with the digital watermark information B when being included in the user segment.

$\chi_B$ (in other words, whether each candidate does not output the second content embedded with the digital watermark information A). This method can specify one or more unauthorized users by repeating this test a total of mn times. Note that mn tests may be performed in a random order instead of the above order. This applies to the following embodiments.

Assume that a set of user IDs is $\{u_1, \ldots, u_n\}$, and conspirators of the test object decryption unit 20χ have user IDs=$u_2$ and $u_4$.

In this case, when receiving header information generated with user IDs=$u_1$, $u_2$, and $u_3$ belonging to the user segment $\chi_B$, and the remaining user IDs belonging to the user segment $\chi_A$, since the test object decryption unit 20χ corresponds to user ID=$u_4$, the test object decryption unit 20χ obtains the session key $s_A$ and outputs the first content embedded with the digital watermark information A. Therefore, after the processing is repeated m times, $C_3$=m is set.

When receiving header information generated with user IDs=$u_1$, $u_2$, $u_3$, and $u_4$ belonging to the user segment $\chi_B$, and the remaining user IDs belonging to the user segment $\chi_A$, since the test object decryption unit cannot obtain the session key $s_A$ and obtains the session key $s_B$ instead, the unit outputs the second content embedded with the digital watermark information B. Therefore, after the processing is repeated m times, $C_4$=0 is set.

Since $C_3 - C_4$ provides the maximum value m, it can be known that the user ID of one of the conspirators of the test object decryption unit 20χ is $u_4$. In addition, changing the labeling order of the users makes it possible to specify the user IDs of all the conspirators.

In general, since there is at least one integer j which satisfies $C_{j-1} - C_j \geq m/n$ and $C_{i-1} - C_i \ll m/n$ when the user of user ID=$u_i$ is not an unauthorized user, detecting an integer j which maximizes $C_{j-1} - C_j$ makes it possible to specify an unauthorized user ID.

Since both the first and second contents embedded with the pieces of digital watermark information A and B are normal contents, even if the test object decryption unit stores past inputs, the unit cannot perform black box tracking and hence always outputs a content embedded with either of the pieces of digital watermark information A and B. Therefore, the above method allows to reliably specify unauthorized users.

In this case, a header can be calculated by using the public key e, anyone can track an unauthorized user by using the tracking apparatus 30.

In the above case, suspects are tested one by one. However, the present invention is not limited to this, and two-branch search may be performed as will be described below. First of all, this method divides a user set into two subsets, generates header information and an encrypted content with the first subset being a user segment $\chi_A$ and the second subset being a user segment $\chi_B$, and inputs them to a test object decryption unit. If an output from the test object decryption unit outputs is the content embedded with digital watermark information A, the user segment $\chi_A$ is divided into two subsets. One of the two obtained subsets is removed from the user segment $\chi_A$ and is added to the user segment $\chi_B$. If an output from the test object decryption unit is the content embedded with the digital watermark information B, the user segment $\chi_B$ is divided into two subsets. One of the two obtained subsets is removed from the user segment $\chi_B$ and is added to the user segment $\chi_A$. The above test is performed for the newly set user segments $\chi_A$ and $\chi_B$. This processing is repeated for up to one suspect. Finally, the users belonging to the user segment χA (or the user segment $\chi_B$) are narrowed down to one. If the test object decryption unit outputs the content embedded with the digital watermark information A (or the digital watermark information B), the one user is specified as an unauthorized user.

In addition, it is possible to perform a J-branch search by setting the number of session keys (the number of pieces of watermark information to be embedded) to be prepared to three or more. This applies to the following embodiments.

As described above, in the content distribution system which provides encrypted contents and header information for decrypting the encrypted contents to a plurality of user systems, the content encryption unit 14 obtains a plurality of encrypted contents by encrypting contents by using a plurality of different session keys $s_j$ (j=1, 2, . . . , n) assigned to a group of a plurality pieces of user identification information for respectively identifying a plurality of user systems, and the header generation unit 15 obtains a plurality of encrypted session keys by encrypting a plurality of session keys by using a public key corresponding to a decryption key unique to each user system. The header generation unit 15 further generates, for the group, generates header information including (a) the plurality of encrypted session keys and (b) the first vector ($L_0$, $L_1$, $L_2$, . . . , $L_{2k-1}$) corresponding to a session key assigned to arbitrary user identification information u in the group which is set such that the inner product of the first vector and the second vector (1, u, $u^2$, . . . , $u^{2k-1}$) concerning the user identification information u becomes equal to $z_j u^{v \bmod 2^k}$ (where $z_j$ is a constant value, of a plurality of different constant values corresponding to the plurality of session keys, which corresponds to the session key $s_j$ assigned to the user identification information u, v is group identification information, and K is a predetermined positive integral value). The header generation unit 15 then transmits at least one of the plurality of encrypted contents and the header information to a plurality of user systems.

Header information includes a plurality of correct session keys, and a user system always obtains one of these corrected session keys. In black box tracking, therefore, this method prevents any unauthorized decryption unit from knowing the intention of an input and can reliably execute tracking even with respect to a smart unauthorized decryption unit which tries to inhibit the specification of an unauthorized user by storing past inputs and reading the intention of an input by using the stored inputs. In addition, forming a user set into a tree structure and introducing key generation polynomials based on the formed tree structure can reduce the transmission overhead as compared with the conventional method which can perform similar black box tracking. Furthermore, only a specific user such as an unauthorized user can be excluded from the system and the decryption keys for the other users can be updated by temporarily invalidating the specific user such as an unauthorized user and updating key generation polynomials without changing the formed tree structure.

According to the above embodiment, header information includes a plurality of encrypted session keys, and a plurality of contents embedded with different pieces of digital watermark information are encrypted by using the session keys. Black box tracking is performed by testing each piece of embedded digital watermark information. It is therefore impossible to identify header information (and an encrypted content) at the time of black box tracking and header information (and an encrypted content) for a normal broadcast. This makes it possible to reliably execute black box tracking with respect to even a smart unauthorized decryption unit which tries to prevent specification of an unauthorized user by reading the intention of an input, because the unauthorized decryption unit cannot know the intention of each input, even if the unauthorized decryption unit stores past inputs.

The conventional black box tracking method having a similar tracking performance is of the first type (its scheme is based on a combinational logic arrangement), and hence needs to greatly increase the transmission overhead. In contrast, this embodiment generates a header based on an algebraic arrangement by forming a user set into a tree structure and assigning key generation polynomials to the respective nodes, and hence can reduce the transmission overhead.

The above embodiment can reliably execute black box tracking with respect to even a smart decryption unit which stores past inputs and operates to prevent the specification of an unauthorized user on the basis of the inputs, without making the unauthorized decryption unit know the intention of an input. This embodiment can also reduce the transmission overhead. In addition, upon specifying an unauthorized user, the embodiment can exclude the unauthorized user from the system.

Second Embodiment

The second embodiment will be described next. The second embodiment will exemplify a method of eliminating the restriction of $m \leq 2k$ without increasing the order of a key generation polynomial when at least one of the users belonging to $Uv_j$ does not belong to a set $\chi i$ and at least one of them belongs to the set $\chi i$ (ST2-4; NO) in step S2-4 in FIG. 6 in the encryption phase in the first embodiment. The second embodiment differs from the first embodiment only in an encryption method and a decryption method to be used when it is determined in step ST2-4 that at least one of the users belonging to $Uv_j$ does not belong to the set $\chi i$ and at least one of them belongs to the set $\chi i$. Therefore, only these methods will be described.

Assume that q is a prime, p−1 is divisible by q, and q is equal to or more than n+2k.

(Encryption Phase)

The following is a case wherein it is determined in step ST2-4 that at least one of the users belonging to $Uv_j$ does not belong to the set $\chi i$ and at least one of them belongs to the set $\chi i$ (ST2-4; NO).

Figure 7:
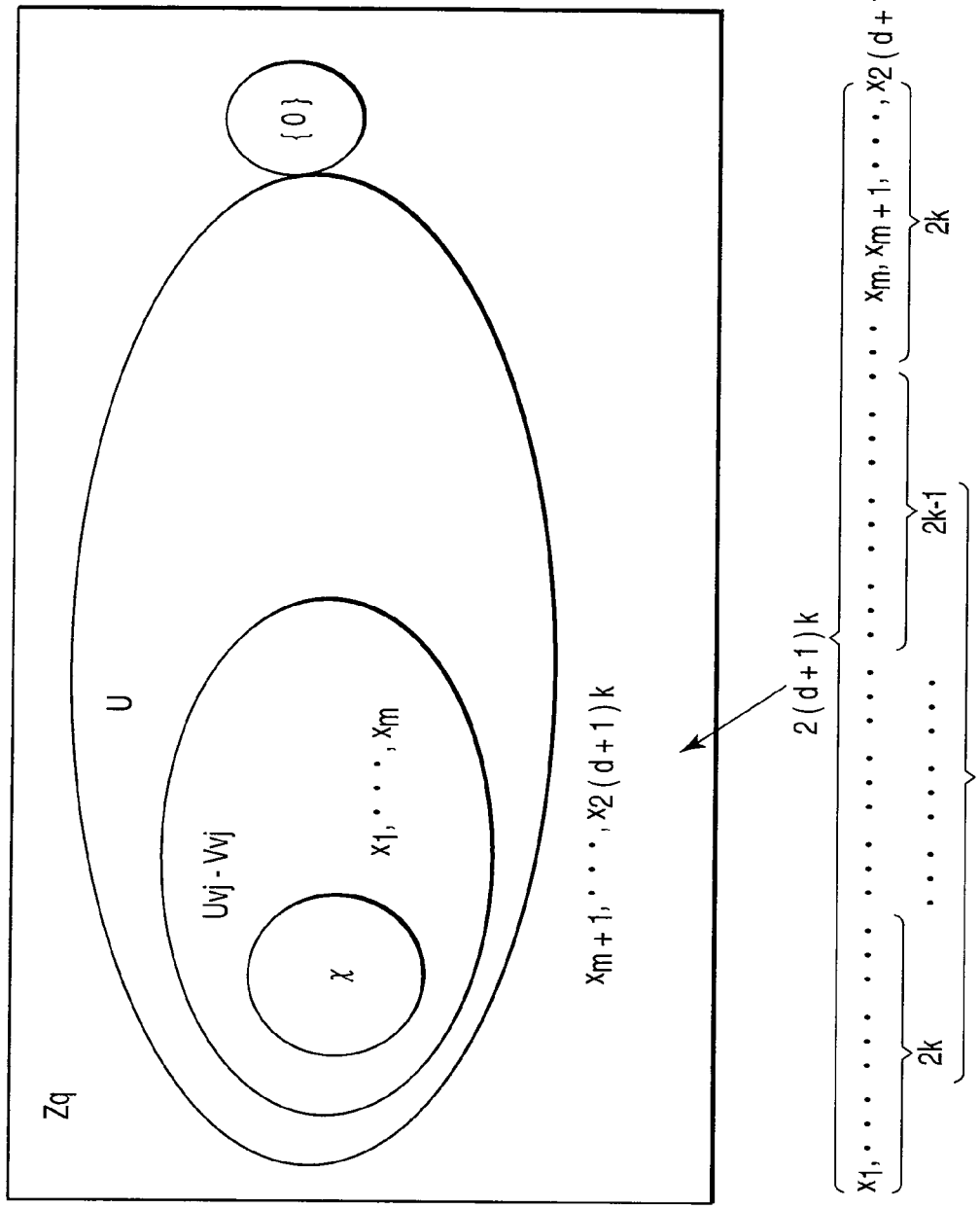
FIG. 7 is a schematic view for explaining processing by a header generation unit.

As shown in FIG. 7, a header generation unit 15 obtains a subset $\{x_1, \ldots, x_m\}$ by removing a set $Vv_j$ from $Uv_j$. In this case, m is the total number of users, of a user set belonging to $Uv_j$, which do not belong to the set $Vv_j$.

The header generation unit 15 searches for an integer d which satisfies $2dk+1 \leq m \leq 2(d+1)k$, and randomly selects $x_{m+1}, \ldots, x_{2(d+1)k}$ from $Zq-(U+\{0\})$ if $2(d+1)k-m>0$. Note that $Zq-(U+\{0\})$ indicates the value obtained by removing a sum set of U and $\{0\}$ from Zq.

The header generation unit 15 obtains elements $L_0, \ldots, L_{2(d+1)k-1}$ of Zq which satisfy equation (14) with respect to $1 \leq t \leq 2(d+1)k$.

$$\sum_{l=0}^{2(d+1)k-1} L_l x_t^l = \begin{cases} z_i x_t^{y_{vj}(\sum_{t=0}^{d} 2kt+2)} \bmod q & (x_t \in \chi_i), \\ z_t' \bmod q & (x_t \in Z_q \setminus (U \cup \{0\})) \end{cases} \quad (14)$$

$$y_{vj} = vj \bmod 2k$$

where $z_t'$ is an arbitrary value on Zq.

The header generation unit 15 then calculates $Hv_j$ by substituting $r_1$ into r according to equation (15):

$$H_{v_j} = (\bar{h}_{v_j}(=g^{r_{v_j}}), \hat{h}_{v_j}(=g^{\lambda_{v_j} r_{v_j}}), h_{v_j,0}, \ldots, h_{v_j,2(d+1)k-1}), \quad (15)$$

$$h_{v_j,i} = \begin{cases} g^{L_i} g^{a_i r_{v_j}} & (y_{v_j} \neq i \bmod 2k), \\ sg^{L_i} g^{c_{v_j} r_{v_j}} & (y_{v_j} = i \bmod 2k) \end{cases}$$

As described above, it suffices to prepare three or more random numbers to be substituted into r and substitute one of the different random numbers into r every time the result in step ST2-4 becomes otherwise.

(Decryption Phase)

Consider a user u belonging to the subset $Uv_j$. In step ST5-6 in FIG. 8, equation (16) is calculated by using $Hv_j$.

$$\left( \frac{\prod_{i=0}^{2(d+1)k-1} h_{v_j,i}^{u^i}}{(\bar{h}_{v_j}^{A v_j(u)} \bar{h}_{v_j}^{B(u)})^{\sum_{t=0}^{d} u^{2kt}}} \right)^{1/u^{y_{vj}(\sum_{t=0}^{d} 2kt+1)}} = \left\{ \frac{s^{u^{y_{vj}(\sum_{t=0}^{d} 2kt+1)}} g^{\sum_{i=0}^{2(d+1)k-1} L_i u^i} \left( g^{r_{v_j} \sum_{i=0}^{2k-1} a_{v_j,i} u^i} \right)^{\sum_{t=0}^{d} u^{2kt}}}{g^{r_{v_j}(A v_j(u) + \lambda_{v_j} B(u)) \sum_{t=0}^{d} u^{2kt}}} \right\}^{1/u^{y_{vj}(\sum_{t=0}^{d} 2kt+1)}} = \quad (16)$$

$$s \left( g^{\sum_{i=0}^{2(d+1)k-1} L_i u^i} \right)^{1/u^{y_{vj}(\sum_{t=0}^{d} 2kt+1)}} = sg^{z_i}(u \in \chi_i) = s_i$$

If the user u belongs to the set χi, the session key si is obtained according to equation (14) (ST8).

As described above, with the arrangement which eliminates the restriction of m≦2k, if at least one of the users belonging to $Uv_j$ does not belong to the set χi and at least one of them belongs to the set χi, the second embodiment can increase the number of users belonging to the set $Uv_j-Vv_j$ by 2dk as compared with the first embodiment (the order of $x_t$ of equation (14) increases from "2k−1" of equation (8) to "2(d+1)k−1", and as a result, the number of elements of the header information $Hv_j$ increases from "2k+2" of equation (9) to "2(d+1)k+2").

In addition to the effects of the first embodiment, the second embodiment can cope with a case wherein when the result in step ST2-4 becomes otherwise (ST2-4; NO), the number of users belonging to the set $Uv_j-Vv_j$ exceeds the restriction described in the first embodiment. In addition, even with the arrangement which eliminates the restriction of m≦2k, the second embodiment can obtain the same effects as those of the first embodiment.

Third Embodiment

The third embodiment will be described next. The third embodiment will exemplify the case of updating decryption keys in the first and second embodiments. A decryption key updating method according to the third embodiment is used to update decryption keys for authorized user systems other than unauthorized user systems so as to inhibit the unauthorized user systems having user IDs from decrypting contents, for all the user systems, when the respective decryption keys are to be updated or the user ID of each unauthorized user is specified by a tracking apparatus 30.

Note that the third embodiment uses the same symbols as those defined in the first embodiment unless otherwise specified.

A key updating procedure will be briefly described below. As described above, a decryption key for user ID=u belonging to a user set Uv allocated to a leaf having a node v as an ancestor or a leaf v is obtained by using key generation polynomials $A_v(x)$ and B(x) as indicated by equation (2) and substituting "u" into "x" of a decryption key generation polynomial $A_v(x)+\lambda_v B(x)$. Therefore, a decryption key for each user system is updated by updating a coefficient group $a_{v,i}$, $\lambda_v$, and $b_i$ of the key generation polynomials $A_v(x)$ and B(x) of equation (2) with $a_{v,i}+a'_{v,i}$, $\lambda_v+\lambda'_v$, and $b_i+b'_i$ (by updating the key generation polynomial itself).

For example, with regard to a set of user IDs (user segment) whose decryption keys need to be updated, contents comprising key update information including pieces of information $a'_{v,i}$, $\lambda'_v$, and $b'_i$ required to update the coefficient group are encrypted by using the session key assigned to the user segment, thereby generating encrypted key update information. As in the technique of making the above content distribution apparatus generate header information and an encrypted content, this embodiment generates encrypted key update information and header information for decrypting the encrypted key update information and transmits them.

With regard to a set of user IDs (user segment) whose decryption keys need not be updated, the key update information encrypted with the session key assigned to the user segment is not transmitted.

As a result, the user system of the user ID belonging to the former user segment can acquire the above key update information, and can update the decryption key. In contrast, the user system of the user ID belonging to the latter user segment cannot acquire the above key update information and cannot update the decryption key.

Processing in the content distribution system and processing in a user system will be described in detail below with reference to the flowchart shown in FIG. 17.

The processing operation of the content distribution system is almost the same as that shown in FIG. 5 except that the system encrypts key update information with a session key instead of encrypting a content with a session key.

Figure 17:
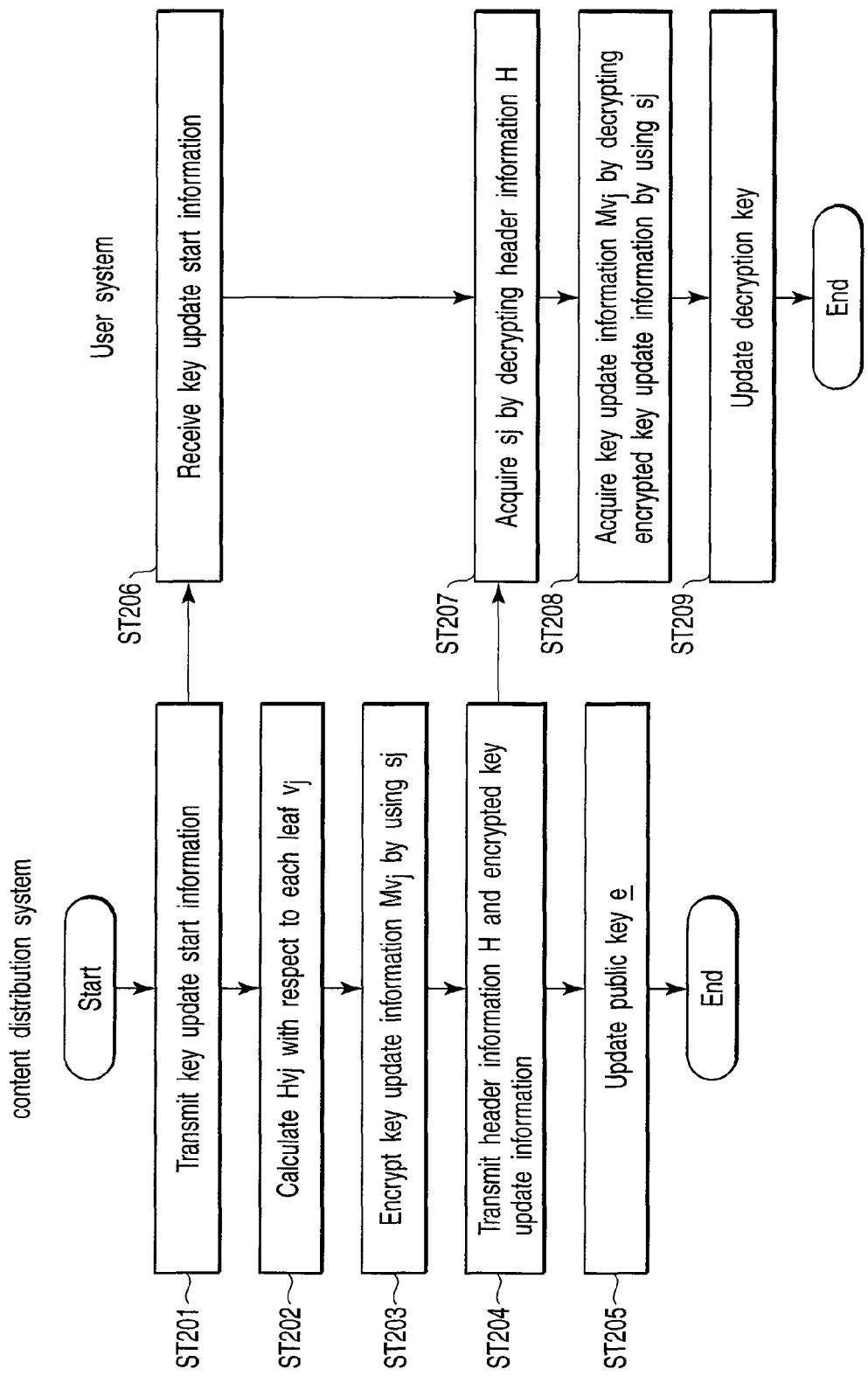
FIG. 17 is a flowchart for explaining update processing for a decryption key.

Referring to FIG. 17, the content distribution system transmits key update start information indicating that key update processing starts to the user system (ST201). In this case, the content distribution system may transmit information to a user system on a one-to-one basis or may broadcast or multicast information to a plurality of user systems. This applies to the following operation.

The content distribution system randomly selects L (j=1, 2, ..., L) random numbers $sj=s_1, \ldots, s_L$ from Gq. L random numbers respectively correspond to L leaves. In addition, the system encrypts the random numbers $s_1, \ldots, s_L$ with the public key stored in a public key storing unit 11, and calculates $Hv_j$ with respect to each leaf $v_j$ according to equation (5) (ST202). Note that header information generation processing by a header generation unit 15 in step ST202 is the same as that in the first embodiment except for the following two points (see FIG. 6 and the like).

(1) Nodes to be selected are L leaves. (2) With regard to each leaf $v_j$, $Hv_j$ is calculated according to equation (5).

$$h_{v_j,t} = \begin{cases} g^{a_t r_{v_j}} & (t \neq v_j \bmod 2k) \\ s_j g^{c_{v_j} r_{v_j}} & (t = v_j \bmod 2k) \end{cases} \quad (17)$$

for $t = 0, \ldots, 2k-1$

The content distribution system randomly selects random numbers $a'_0, \ldots, a'_{2k-1}, b'_0, \ldots, b'_{2k-1}, c'_0, \ldots, c'_{2L-3}, \lambda'_0, \ldots, \lambda'_{2L-3}$ from Zq and repeats the following processing with respect to $1 \leq j \leq L$. The content distribution system generates key update information $Mv_j$ and performs secret-key encryption which encrypts the key update information $Mv_j$ by using the random number corresponding to the leaf $v_j$, i.e., the session key $s_j$ (ST203). The encrypted key update information is represented by $M'v_j$. The key update information $Mv_j$ contains information for updating a coefficient group of the key generation polynomials $A_v(B)$ and B(x), i.e., the selected random numbers $a'_0, \ldots, a'_{2k-1}, b'_0, \ldots, b'_{2k-1}, c'_0, \ldots, c'_{2L-3}, \lambda'_0, \ldots, \lambda'_{2L-3}$.

The key update information $Mv_j$ will be described below. If the leaf $v_j$ is rewritten as $v_{j,1}$ and the respective nodes reaching from the leaf $v_{j,1}$ to the root are represented by $v_{j,2}, \ldots, v_{j,\log 2L}$, the key update information $Mv_j$ is represented by $$M_{v_j} = M_{v_{j,1}} \| \ldots \| M_{v_{j,\log_2 L}} \| b'_0 \| \ldots \| b'_{2k-1} \quad (18)$$

$$M_{v_{j,i}} = a''_{v_{j,i},0} \| \ldots \| a''_{v_{j,i},2k-1}$$

$$a''_{v_{j,i},t} = a'_{v_{j,i},t} - \{(\lambda_{v_{j,i}} + \lambda'_{v_{j,i}})(b_t + b'_t) - \lambda_{v_{j,i}} b_t\} \bmod q$$

$$a'_{v_{j,i},t} = \begin{cases} a'_t & (t \neq v_{j,i} \bmod 2k), \\ c'_{v_{j,i}} & (t = v_{j,i} \bmod 2k) \end{cases}$$

where ∥ represents data concatenation.

The information $M'v_1, \ldots, M'v_L$ obtained by the above repetitive processing is set as encrypted key update information $M'$. The content distribution system transmits the encrypted key update information $M'$ to the user system (ST204). If it is known that a user system as a transmission destination belongs to $Uv_j$, it suffices to transmit only $M'v_j$.

In addition, the content distribution system transmits header information H to the user system (ST204). If it is known that a user system as a transmission destination is $Uv_j$, it suffices to transmit only $Hv_j$.

The content distribution system calculates a new public key $e_{new}$ according to the following equation (ST205).

$$e_{new} = (g, g^{\lambda_0 + \lambda'_0}, \ldots, g^{\lambda_{2L-3} + \lambda'_{2L-3}}, g^{a_0 + a'_0}, \ldots, g^{a_{2k-1} + a^{2k-1}}, g^{c_0 + c'_0}, \ldots, g^{c_{2L-3} + c'_{2L-1}}) \quad (19)$$

Processing in a user system belonging to a subgroup in which a user ID is u and assigned to $Uv_j$ ($v_j$ is a leaf) will be described next. Upon receiving key update start information (ST206), the user system decrypts header information H (or $Hv_j$) transmitted from the content distribution system and acquires $s_j$ (ST207). The decryption method for the header information H in this case is the same as that described in the first embodiment.

The user system selects $M'v_j$ which the user system can decrypt with the encrypted key update information $M'$ transmitted from the content distribution system (or receives only $M'v_j$), decrypts $M'v_j$ by using $s_j$, and acquires $Mv_j$ (ST208).

Assume that the leaf $v_j$ is rewritten as $v_{j,1}$, and the respective nodes reaching from the leaf $v_{j,1}$ to the root are $v_{j,2}, \ldots, v_{j, \log 2L}$. In this case, the user system calculates new decryption keys $A_{new}$ and $B_{new}$ with respect to $1 \le i \le \log 2L$ according to the following equation (ST 209).

$$A_{new, v_{j,i}}(u) = A_{v_{j,i}}(u) + \sum_{t=0}^{2k-1} a''_{v_{j,i}, t} u^t \bmod q, \quad (20)$$

$$B_{new}(u) = B(u) + \sum_{t=0}^{2k-1} b'_t u^t \bmod q$$

In this case, the user system updates the respective coefficients of the key generation polynomial as follows:

$$A_{new, v}(x) = \sum_{i=0}^{2k-1} \{(a_{v,i} + a^i_{v,i}) - (\lambda_v + \lambda'_v)(b_i + b'_i)\} x^i \bmod q, \quad (21)$$

$$B_{new}(x) = \sum_{i=0}^{2k-1} (b_i + b'_i) x^i \bmod q,$$

$$a'_{v,i} = \begin{cases} a'_i & (i \ne v \bmod 2k) \\ c'_v & (i = v \bmod 2k) \end{cases}$$

It is obvious from equations (19) and (21) that the updated public key and the user decryption key are made to correspond to each other.

In the above case, the coefficients $a_{v,i}$, $\lambda_v$ and $b_i$ are updated. However, it is possible to update only $a_{v,i}$ and $b_i$ without updating $\lambda_v$ (while setting $\lambda'_v = 0$). It is also possible to update only $a_{v,i}$ without updating $\lambda_v$ and $b_i$ (while setting $\lambda'_v = 0$ and $b'_i = 0$). In this case, it is not necessary to include $b'_i$ in the key update information $Mv_j$ in equation (18).

In the above case, the content distribution system starts key update processing by transmitting key update start information to the user system. However, it suffices to start key update processing by making the user system transmit information indicating a request to update a key to the content distribution system. In addition, the content distribution system may generate header information, encrypted key update information, and a new public key in any order instead of the above order, or may generate header information, encrypted key update information, and a new public key before transmitting key update start information to the user system.

Using the decryption key invalidation method disclosed in reference 5 (T. Matsushita, "Black-Box Traitor Tracing Schemes for Copyright Protection", PhD Thesis, The University of Tokyo, Japan, January 2006) makes it possible to inhibit a specific user system from updating a key and to exclude the specific user system from the data communication system.

More specifically, the content distribution system randomly selects s from Gq in addition to the above header information H, encrypts s by using the encryption method disclosed in reference 5, generates header information H', and transmits the information to the user system. Only a user system which is permitted to decrypt s can acquire s in the header information H', but a user system which is inhibited from decrypting s (invalidation object user system) cannot acquire s. The content distribution system generates the key update information $Mv_j$ and performs secret-key encryption which encrypts the key update information $Mv_j$ F by using $s'j = F(s_j, s)$ with respect to a given function. The following is an example of the function F:

$$F(s_j, s) = s_j \oplus s$$

where $\oplus$ represents exclusive OR for each bit.

The user system decrypts the pieces of header information H and H' and acquires $s_j$ and s. The user system decrypts encrypted key update information by using $s'_j$ and updates the decryption key. This inhibits the invalidation object user system from acquiring s and hence inhibits the system from updating the decryption key.

In the above case, key updating processing is performed between the content distribution system and the user system. However, it suffices to perform key updating between the user system and a reliable third party instead of the content distribution system and notify the content distribution system of an updated public key.

The embodiments described above, the content distribution system and tracking system can reliably specify an unauthorized user even from a smarter unauthorized decryption unit with a small transmission overhead.

Note that all the above embodiments are mainly expressed in the category of "system". Obviously, however, the present invention is not limited to this, and the embodiments can be expressed in an arbitrary category such as an "apparatus", "method", "computer-readable storage medium", or "program". It also suffices to extract part of the system and express it in another category as well as changing the overall category of the system.

In addition, the encryption units, decryption units, and tracking apparatuses in all the embodiments described above can be implemented as hardware such as semiconductor integrated devices or software (programs for causing a computer to execute predetermined means, causing the computer to function as predetermined means, or causing the computer to implement predetermined functions). Obviously, these apparatuses and units can be implemented by both hardware and software.

When the above apparatuses and units are to be implemented as programs, the programs can be distributed by being stored in storage media such as magnetic disks (floppy (registered trademark) disks, hard disks, and the like), optical disks (CD-ROMs, DVDs, and the like), and semiconductor memories.

In addition, such storage media can take any storage form as long as they are computer-readable storage media capable of storing the programs.

In addition, an OS (Operating System) operating on a computer on the basis of instructions from programs installed from a storage medium into the computer, MW (middleware) such as database management software or network software, or the like may execute some of the processes for implementing the above embodiments.

The storage medium in the present invention includes not only a medium independent of the computer but also a storage medium which downloads and stores or temporarily stores a program sent through a LAN, Internet, or the like.

In addition, the number of storage media is not limited to one, and the storage medium of the present invention also includes a plurality of media used to execute the processes in the above embodiments. That is, the present invention is not limited to any specific storage arrangement.

Note that the computer in the present invention executes the respective processes in the above embodiments on the basis of the programs stored in the storage medium, and the present invention may take any arrangement, e.g., an apparatus comprising a single device such as a personal computer or a system comprising a plurality of devices connected to each other through a network.

Furthermore, the computer of the present invention is not limited to a personal computer, and is a generic name for devices and apparatuses capable of implementing the functions of the present invention on the basis of programs, including processing units, microcomputers, and the like contained in data processing devices.

What is claimed is:

1. A content distribution system comprising:
   a content encryption unit configured to encrypt a content by using a plurality of different session keys $s_j$ (j=1, 2, ..., n), to obtain a plurality of encrypted contents;
   a session key encryption unit configured to encrypt each of the plurality of different session keys with a public key corresponding to a decryption key unique to each user system, to obtain a plurality of encrypted session keys;
   a header information generation unit configured to generate, for a group including a plurality of user identification information items for respectively identifying a plurality of user systems to which the plurality of different session keys are assigned, header information which allows decryption of each encrypted session key assigned to each user system by using the decryption key unique to each user system belonging to the group, the header information including
   (a) the encrypted session keys, and
   (b) a first vector $(L_0, L_1, L_2, \ldots, L_k)$ which corresponds to a session key of the plurality of different session keys and is assigned to arbitrary user identification information item u in the group, the first vector being set such that an inner product of the first vector and a second vector $(1, u, u^2, \ldots, u^k)$ concerning the arbitrary user identification information item u becomes equal to $z_j u^v$ (where k is a predetermined positive integer, $z_j$ is a constant value which is one of a plurality of different constant values corresponding to the plurality of different session keys and corresponds to a session key $s_j$ assigned to the arbitrary user identification information item u, and v is a group identification information item assigned to the group and is an integer not less than "0" and not more than k ); and
   a hardware transmitter to transmit the header information and at least one of the plurality of encrypted contents to the plurality of user systems.

2. The system according to claim 1, wherein the header information generation unit sets the first vector such that the inner product of the first vector and the second vector $$\sum_{i=0}^{2k'-1} L_i u^i$$

(where k' is a maximum value which is set in advance with respect to the number of unauthorized user identification information items and satisfies k=2k'−1) becomes equal to $z_j u^{v \bmod 2k'}$.

3. The system according to claim 1, wherein the decryption key unique to each user system is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a set of user identification information items including the group, and (c) substituting a first user identification information item of the user system into one of the individual key generation polynomials which corresponds to one of leaves assigned to one of the subgroups to which the first user identification information item corresponding to the user system belongs or an ancestor node of the one of the leaves and substituting the first user identification information item of the user system into a common key generation polynomial common to the root, the nodes, and the leaves.

4. The system according to claim 3, wherein at least one of linear sums of coefficients with the same order terms of the individual key generation polynomial and the common key generation polynomial differs for each of the root, the nodes, and the leaves on the tree structure, and the linear sums of other coefficients with the same order are constant.

5. The system according to claim 3, wherein
the individual key generation polynomial $A_v(x)$ and the common key generation polynomial $B(x)$ assigned to one (v) of the root, the nodes, and the leaves of the tree structure are given by $$A_v(x) = \sum_{i=0}^{k_a} (a_{v,i} - \lambda_v b_i) x^i \bmod q$$

$$B(x) = \sum_{i=0}^{k_b} b_i x^i \bmod q$$

(where $\lambda_v$ is a constant value unique to each of the root, the nodes, and the leaves, $k_a$ and $k_b$ are arbitrary positive integral values, and q is a predetermined positive integral value), and
at least one coefficient $a_{v,n}$ (an integer satisfying $0 \leq n \leq k_a$) of coefficients $a_{v,i}$ (i=0, 1, ..., $k_a$) of the individual key generation polynomial $A_v(x)$ is a constant value unique to each of the root, the nodes, and the leaves.

6. The system according to claim 1, wherein the content encryption unit encrypts a plurality of contents embedded with different digital watermark information items by using the respective session keys of the plurality of different session keys, to obtain the plurality of encrypted contents.

7. The system according to claim 1, wherein
the group includes a first user system group assigned with a first session key $s_1$ of the plurality of different session keys and a second user system group assigned with a second session key $s_2$ of the plurality of different session keys, and
the content encryption unit encrypts a first content embedded with a first digital watermark information item of the digital watermark information items by using the first session key, and encrypts a second content embedded with a second digital watermark information item of the digital watermark information items by using the second session key.

8. The system according to claim 1, wherein the content is key update information required to update the decryption key unique to each user system.

9. The system according to claim 3, wherein the content is key update information required to update coefficients of the individual key generation polynomial.

10. The system according to claim 3, wherein the content is key update information required to update coefficients of the individual key generation polynomial and the common key generation polynomial.

11. The system according to claim 5, wherein the content is key update information required to update (a) coefficients $a_{v,i}$, or (b) coefficients $a_{v,i}$ and coefficients $b_i$, or (c) coefficients $a_{v,i}$, a constant value $\lambda_v$, and coefficients $b_i$.

12. The system according to claim 5, wherein the content is key update information including a coefficients $a'_{v,i}$ and coefficients $b'_i$ required to update the individual key generation polynomial $A_v(x)$ and the common key generation polynomial $B(x)$ to a new individual key generation polynomial $A_{new,v}(x)$ and a new common key generation polynomial $B_{new}(x)$:

$$A_{new,v}(x) = \sum_{i=0}^{K_a} \{(a_{v,i} + a'_{v,i}) - \lambda_v(b_i + b'_i)\}x^i \bmod q,$$

$$B_{new}(x) = \sum_{i=0}^{K_b} (b_i + b'_i)x^i \bmod q.$$

13. A tracking system for specifying an unauthorized user identification information item from a plurality of user identification information items for respectively identifying a plurality of user systems by testing a test object which is one of the plurality of user systems, the system comprising:
a content encryption unit configured to encrypt a plurality of contents embedded with different digital watermark information items by using a plurality of different session keys $s_j$ (j=1, 2, . . . , n), to obtain a plurality of encrypted contents;
an assignment unit configured to assign the plurality of different session keys to a group including a plurality of user identification information items, by (a) dividing the group into a plurality of user segments and (b) assigning the plurality of different session keys to the plurality of user segments respectively;
a header information generation unit configured to generate, every time the assignment of the plurality of different session keys is changed, a header information item for the group which allows decryption of each encrypted session key assigned to each user system by using a decryption key unique to each user system belonging to the group, the header information item including
(a) a plurality of encrypted session keys each obtained by encrypting each of the plurality of different session keys with a public key corresponding to a decryption key unique to each user system, and
(b) a first vector $(L_0, L_1, L_2, \ldots, L_k)$ which corresponds to a session key of the plurality of different session keys and is assigned to arbitrary user identification information item u in the group, the first vector being set such that an inner product of the first vector and a second vector $(1, u, u^2, \ldots, u^k)$ concerning the arbitrary user identification information item u becomes equal to $z_j u^v$ (where k is a predetermined positive integer, $z_j$ is a constant value which is one of a plurality of different constant values corresponding to the plurality of different session keys and corresponds to a session key $s_j$ assigned to the arbitrary user identification information item u, and v is one of integers not less than "0" and not more than k which are assigned as a group identification information item to the group), to obtain a plurality of header information items generated every time the assignment of the plurality of different session keys is changed;
an input unit configured to input the plurality of encrypted contents and each of the plurality of header information items to the test object;
a hardware transmitter to transmit the plurality of header information items to the plurality of user systems;
an acquiring unit configured to acquire, as a decryption result of the plurality of encrypted contents, a decrypted content of the test object, and to obtain decryption results corresponding to the plurality of header information items; and
a control unit configured to specify not less than one unauthorized user identification information item which the test object has, based on a relationship between the plurality of header information items and the decryption results.

14. The system according to claim 13, wherein the header information generation unit sets the first vector such that the inner product of the first vector and the second vector $$\sum_{i=0}^{2k'-1} L_i u^i$$

(where k' is a maximum value which is set in advance with respect to the number of unauthorized user identification information items and satisfies k=2k'−1) becomes equal to $z_j u^{v \bmod 2k'}$.

15. The system according to claim 13, wherein the decryption key unique to each user system is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a set of user identification information items including the group, and (c) substituting a first user identification information item of the user system into one of the individual key generation polynomials which corresponds to one of leaves assigned to one of the subgroups to which the first user identification information item corresponding to the user system belongs or an ancestor node of the one of the leaves and substituting the first user identification information item of the user system into a common key generation polynomial common to the root, the nodes, and the leaves.

16. The system according to claim 15, wherein at least one of linear sums of coefficients of the same order terms of the individual key generation polynomials and the common key generation polynomial differs for the root, each node, and each leaf on the tree structure, and other linear sums of coefficients of the same order terms are constant.

17. The system according to claim 13, wherein the assignment unit assigns two different session keys to the group by (a) dividing the group into two user segments and (b) assigning the two different session keys to the two user segments respectively.

18. A content distribution method including:
encrypting a content by using a plurality of different session keys $s_j$ (j=1, 2, ..., n), to obtain a plurality of encrypted contents;
encrypting each of the plurality of different session keys with a public key corresponding to a decryption key unique to each user system, to obtain a plurality of encrypted session keys;
generating, for a group including a plurality of user identification information items for respectively identifying a plurality of user systems to which the plurality of different session keys are assigned, header information which
allows decryption of each encrypted session key assigned to each user system by using the decryption key unique to each user system belonging to the group, the header information including
(a) the encrypted session keys, and
(b) a first vector $(L_0, L_1, L_2, \ldots, L_k)$ which corresponds to a session key of the plurality of different session keys and is assigned to arbitrary user identification information item u in the group, the first vector being set such that an inner product of the first vector and a second vector $(1, u, u^2, \ldots, u^k)$ concerning the arbitrary user identification information item u becomes equal to $z_j u^v$ (where k is a predetermined positive integer, $z_j$ is a constant value which is one of a plurality of different constant values corresponding to the plurality of different session keys and corresponds to a session key $s_j$ assigned to the arbitrary user identification information item u, and v is a group identification information item assigned to the group and is an integer not less than "0" and not more than k); and
transmitting the header information and at least one of the plurality of encrypted contents to the plurality of user systems.

19. The method according to claim 18, wherein generating the header information sets the first vector such that the inner product of the first vector and the second vector $$\sum_{i=0}^{2k'-1} L_i u^i$$

(where k' is a maximum value which is set in advance with respect to the number of unauthorized user identification information items and satisfies k=2k'−1) becomes equal to $z_j u^{v \bmod 2k'}$.

20. The method according to claim 18, wherein the decryption key unique to each user system is a value obtained by (a) assigning different individual key generation polynomials to a root, a plurality of nodes, and a plurality of leaves of a tree structure, respectively, (b) assigning the different leaves on the tree structure a plurality of subgroups obtained by dividing a set of user identification information items including the group, and (c) substituting a first user identification information item of the user system into one of the individual key generation polynomials which corresponds to one of leaves assigned to one of the subgroups to which the first user identification information item corresponding to the user system belongs or an ancestor node of the one of the leaves and substituting the first user identification information item of the user system into a common key generation polynomial common to the root, the nodes, and the leaves.

21. The method according to claim 20, wherein at least one of linear sums of coefficients with the same order terms of the individual key generation polynomial and the common key generation polynomial differs for each of the root, the nodes, and the leaves on the tree structure, and the linear sums of other coefficients with the same order are constant.

22. The method according to claim 18, wherein the content is key update information required to update the decryption key unique to each user system.

23. The method according to claim 20, wherein the content is key update information required to update (a) coefficients of the individual key generation polynomial, or (b) coefficients of the individual key generation polynomial and the common key generation polynomial.

24. A tracking method for specifying an unauthorized user identification information item from a plurality of user identification information items for respectively identifying a plurality of user systems by testing a test object which is one of the plurality of user systems, the method including:
encrypting a plurality of contents embedded with different digital watermark information items by using each of a plurality of different session keys $s_j$ (j=1, 2, ..., n), to obtain a plurality of encrypted contents;
assigning the plurality of different session keys to a group including a plurality of user identification information items, by (a) dividing the group into a plurality of user segments and (b) assigning the plurality of different session keys to the plurality of user segments respectively;
generating, every time the assignment of the plurality of different session keys is changed, a header information item for the group which allows decryption of each encrypted session key assigned to each user system by using a decryption key unique to each user system belonging to the group, the header information item including
(a) a plurality of encrypted session keys each obtained by encrypting each of the plurality of different session keys with a public key corresponding to a decryption key unique to each user system, and
(b) a first vector $(L_0, L_1, L_2, \ldots, L_k)$ which corresponds to a session key of the plurality of different session keys and is assigned to arbitrary user identification information item u in the group, the first vector being set such that an inner product of the first vector and a second vector $(1, u, u^2, \ldots, u^k)$ concerning the arbitrary user identification information item u becomes equal to $z_j u^v$ (where k is a predetermined positive integer, $z_j$ is a constant value which is one of a plurality of different constant values corresponding to the plurality of different session keys and corresponds to a session key $s_j$ assigned to the arbitrary user identification information item u, and v is one of integers not less than "0" and not more than k which are assigned as a group identification information item to the group), to obtain a plurality of header information items generated every time the assignment of the plurality of different session keys is changed;

inputting the plurality of encrypted contents and each of the plurality of header information items to the test object;

acquiring a decrypted content as a decryption result of the plurality of encrypted contents of the test object, to obtain decryption results corresponding to the plurality of header information items; and specifying not less than one unauthorized user identification information item which the test object has, based on a relationship between the plurality of header information items and the decryption results.

25. The method according to claim 24, wherein generating the header information item sets the first vector such that the inner product of the first vector and the second vector $$\sum_{i=0}^{2k'-1} L_i u^i$$

(where k' is a maximum value which is set in advance with respect to the number of unauthorized user identification information items and satisfies k=2k'−1) becomes equal to $z_j u^{v \bmod 2k'}$.

* * * * *